United States Patent
Sawaki

(10) Patent No.: US 10,445,917 B2
(45) Date of Patent: Oct. 15, 2019

(54) METHOD FOR COMMUNICATION VIA VIRTUAL SPACE, NON-TRANSITORY COMPUTER READABLE MEDIUM FOR STORING INSTRUCTIONS FOR EXECUTING THE METHOD ON A COMPUTER, AND INFORMATION PROCESSING SYSTEM FOR EXECUTING THE METHOD

(71) Applicant: COLOPL, Inc., Tokyo (JP)

(72) Inventor: Kazuaki Sawaki, Tokyo (JP)

(73) Assignee: COLOPL, INC., Tokyo (JP)

( * ) Notice: Subject to any disclaimer, the term of this patent is extended or adjusted under 35 U.S.C. 154(b) by 14 days.

(21) Appl. No.: 15/834,022

(22) Filed: Dec. 6, 2017

(65) Prior Publication Data

US 2018/0165862 A1    Jun. 14, 2018

(30) Foreign Application Priority Data

Dec. 7, 2016 (JP) .................................. 2016-237480

(51) Int. Cl.
   *G06T 13/40* (2011.01)
   *G06K 9/00* (2006.01)
   *G06T 1/20* (2006.01)

(52) U.S. Cl.
   CPC .......... *G06T 13/40* (2013.01); *G06K 9/00281* (2013.01); *G06K 9/00315* (2013.01); *G06K 9/00335* (2013.01); *G06T 1/20* (2013.01)

(58) Field of Classification Search
   CPC ....... G06T 13/40; G06T 1/20; G06K 9/00281; G06K 9/00315; G06K 9/00335
   See application file for complete search history.

(56) References Cited

U.S. PATENT DOCUMENTS

| 2009/0002479 | A1* | 1/2009 | Sangberg ............... H04N 7/147 348/14.02 |
| 2010/0007665 | A1 | 1/2010 | Smith et al. |
| 2010/0060647 | A1* | 3/2010 | Brown .................. G06T 13/205 345/473 |
| 2010/0189357 | A1 | 7/2010 | Robin et al. |

(Continued)

FOREIGN PATENT DOCUMENTS

| JP | 2009-533786 A | 9/2009 |
| JP | 2009-231879 A | 10/2009 |

(Continued)

OTHER PUBLICATIONS

Office Action in JP Application No. 2016-237480, dated Sep. 19, 2017, 7pp.

(Continued)

*Primary Examiner* — Yu Chen
(74) *Attorney, Agent, or Firm* — Hauptman Ham, LLP

(57) ABSTRACT

A method includes defining a virtual space, wherein the virtual space comprises a first avatar object associated with a first user. The method further includes detecting a motion of a portion of a face of the first user. The method further includes generating face data representing the detected motion of the portion of the face. The method further includes modifying the face data to change a magnitude of the detected motion of the portion of the face. The method further includes controlling a face of the first avatar object based on the face data or the modified face data.

20 Claims, 24 Drawing Sheets

(56) References Cited

U.S. PATENT DOCUMENTS

| | | | |
|---|---|---|---|
| 2010/0259538 A1* | 10/2010 | Park | G06T 13/40 345/419 |
| 2010/0292005 A1* | 11/2010 | Miyamoto | G06T 13/40 463/34 |
| 2010/0295771 A1* | 11/2010 | Burton | G06F 3/011 345/156 |
| 2011/0052081 A1 | 3/2011 | Onoe et al. | |
| 2012/0075463 A1 | 3/2012 | Chen et al. | |
| 2012/0223952 A1* | 9/2012 | Kanemaru | G06T 13/40 345/473 |
| 2014/0104282 A1* | 4/2014 | Sheerin | G06T 13/40 345/473 |
| 2017/0039750 A1* | 2/2017 | Tong | G06T 13/40 |
| 2018/0027307 A1* | 1/2018 | Ni | H04N 21/4788 345/419 |

FOREIGN PATENT DOCUMENTS

| | | |
|---|---|---|
| JP | 2010-507854 A | 3/2010 |
| JP | 2011-70623 A | 4/2011 |
| JP | 2013-206135 A | 10/2013 |
| JP | 2013-545163 A | 12/2013 |
| JP | 2014-225801 A | 12/2014 |

OTHER PUBLICATIONS

Miyazaki et al., "Software that adds peace of mind and enjoyment to visual communication", OKI Technical Review, vol. 71 No. 1, Jan. 1, 2004, pp. 114-117, Oki Electric Industry Co., LTD, Japan, 12pp.

* cited by examiner

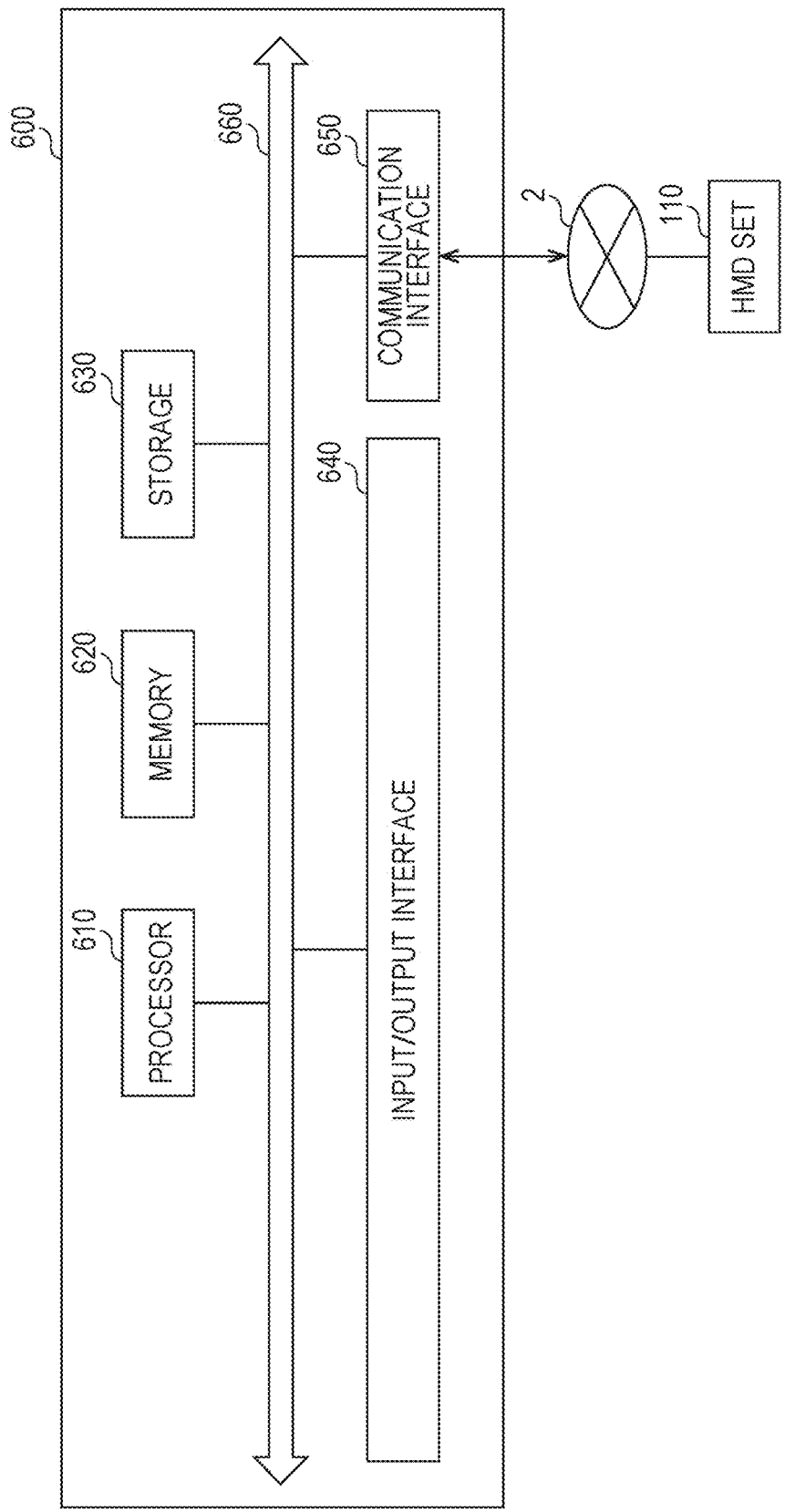

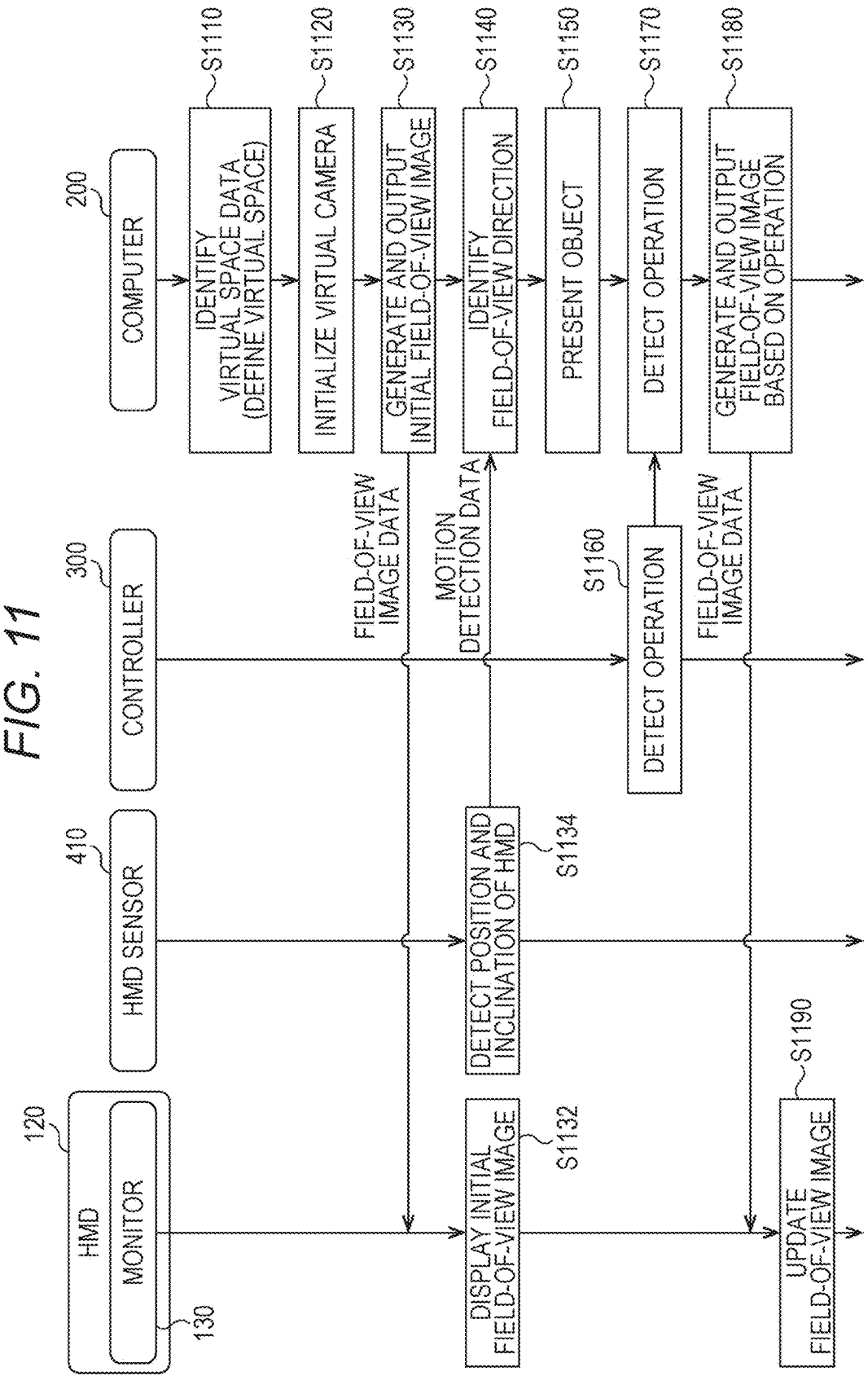

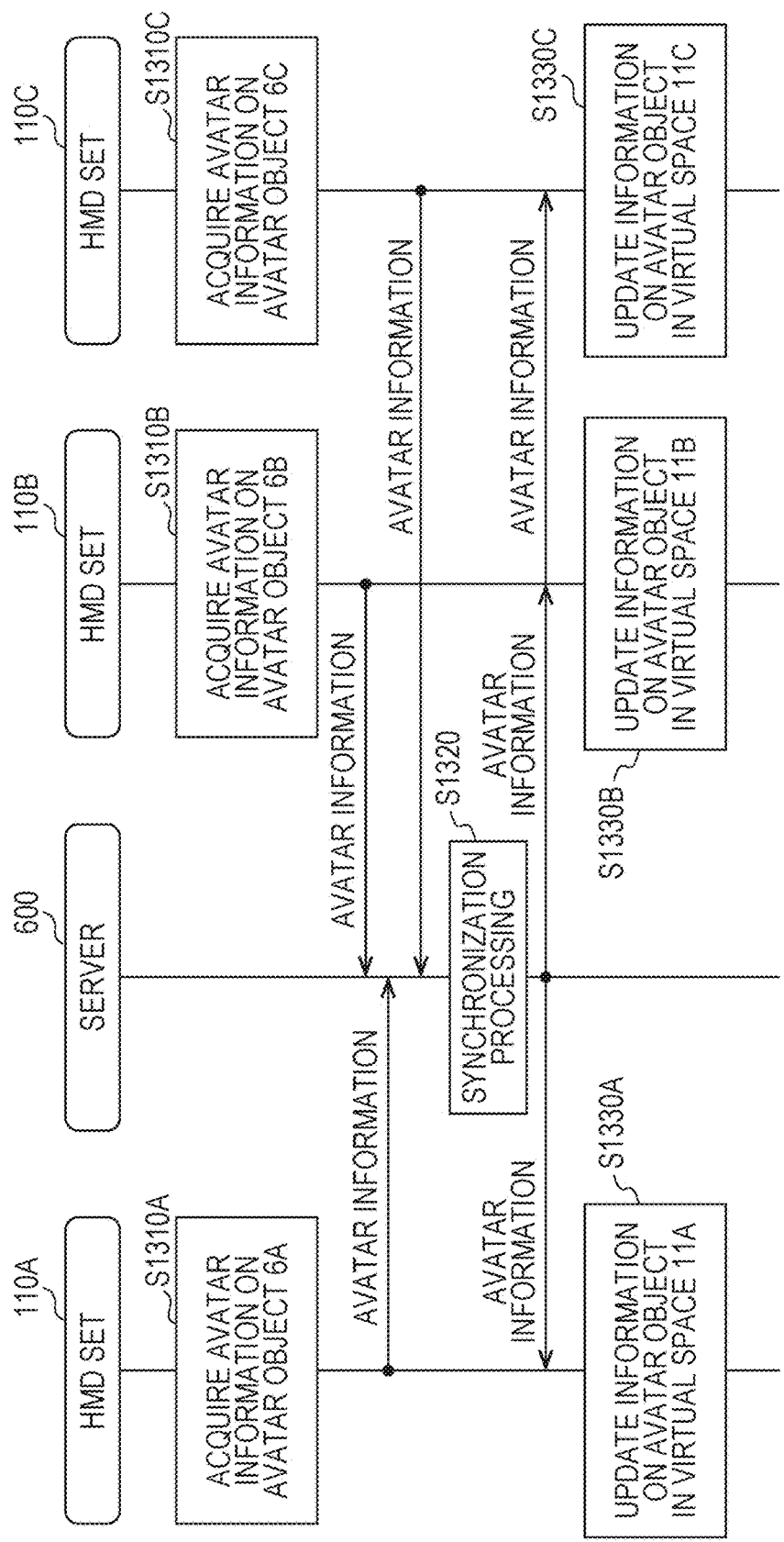

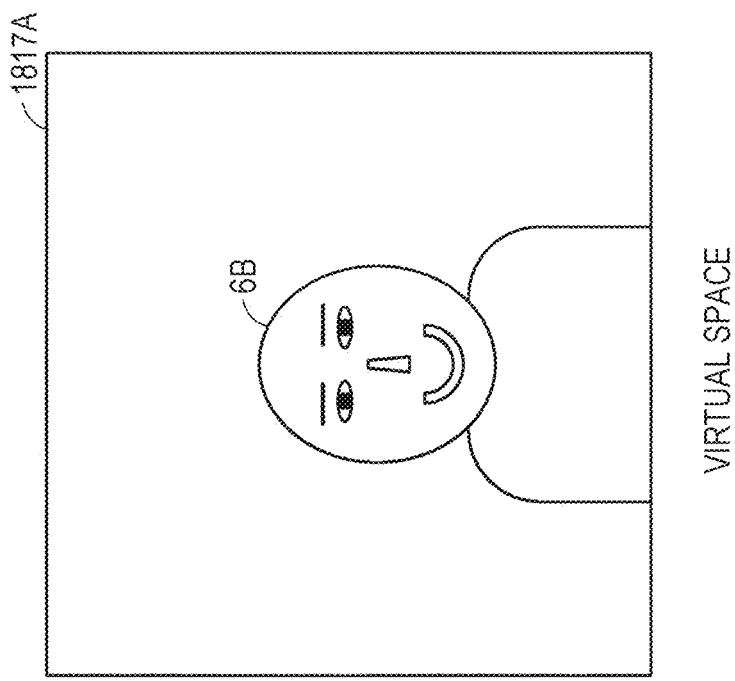
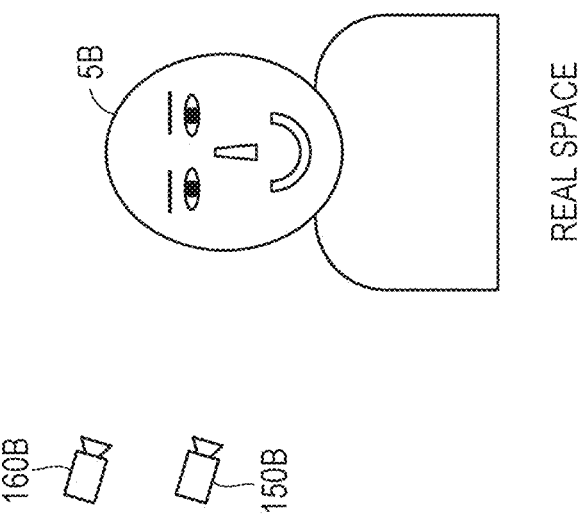

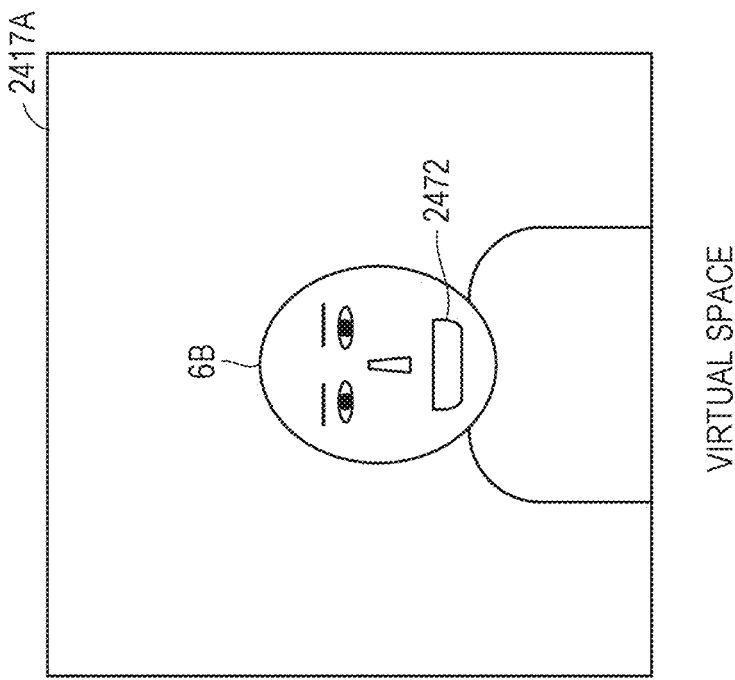
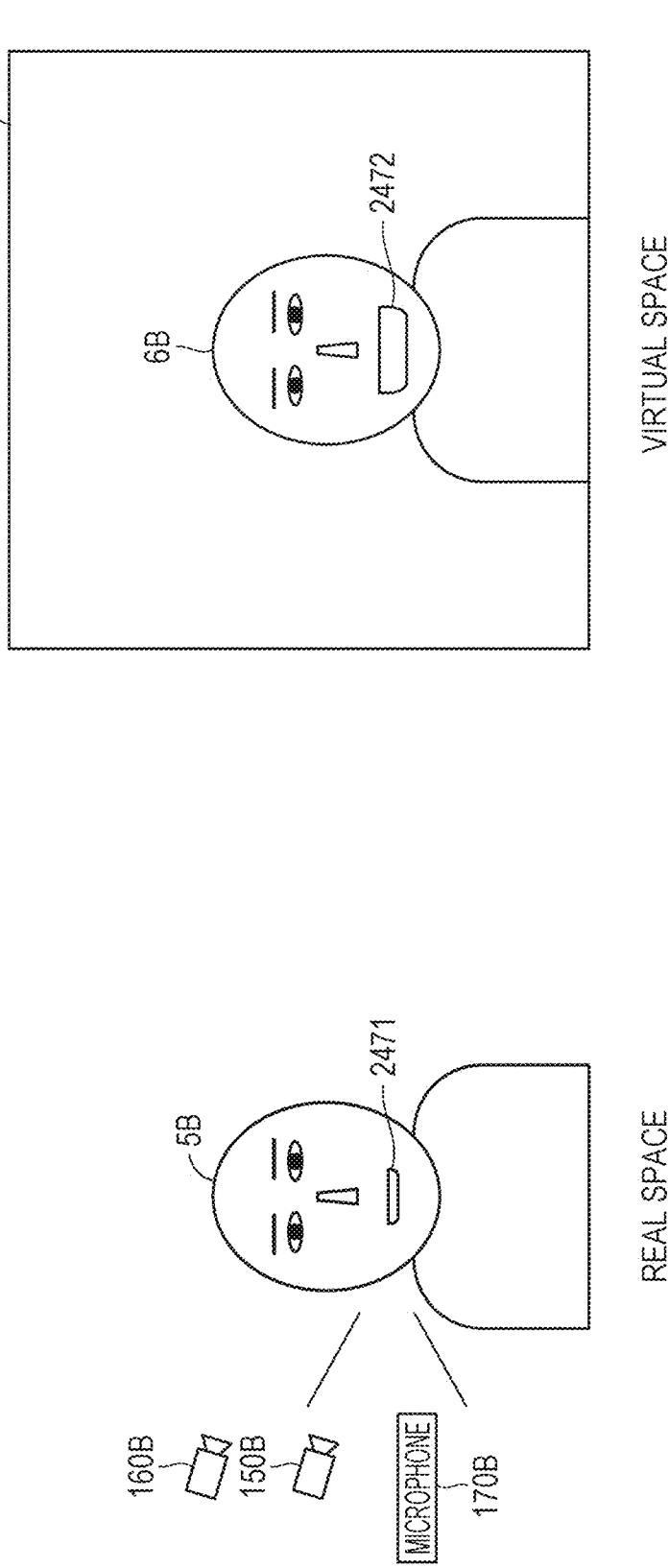

US 10,445,917 B2

METHOD FOR COMMUNICATION VIA VIRTUAL SPACE, NON-TRANSITORY COMPUTER READABLE MEDIUM FOR STORING INSTRUCTIONS FOR EXECUTING THE METHOD ON A COMPUTER, AND INFORMATION PROCESSING SYSTEM FOR EXECUTING THE METHOD

RELATED APPLICATIONS

The present application claims priority to Japanese application No. 2016-237480, filed Dec. 7, 2016, the disclosure of which is hereby incorporated by reference herein in its entirety.

TECHNICAL FIELD

This disclosure relates to a technology of controlling an avatar arranged in a virtual space, and more particularly, to a technology of controlling a facial expression of the avatar.

BACKGROUND

There is known a technology of providing virtual reality with use of a head-mounted device (HMD). Further, there is proposed a technology of arranging respective avatars of a plurality of users in a virtual space for communication among the plurality of users via those avatars.

As a technology of enhancing communication using avatars, there is known a technology of detecting a motion of a face of a user by a face-tracking technology (Patent Documents 1 to 3) and reflecting the detected motion of the face in an avatar. For example, in Patent Document 1, there is described a technology of detecting a motion of a mouth of a user by pattern matching.

PATENT DOCUMENTS

[Patent Document 1] JP 2009-231879 A
[Patent Document 2] JP 2009-533786 A
[Patent Document 2] JP 2010-507854 A

SUMMARY

According to at least one embodiment of this disclosure, there is provided a method including the steps of defining a virtual space, the virtual space including a first avatar object associated with a first user; detecting a motion of a face of the first user: generating face data representing the motion of the face; changing the face data so that the detected motion of the face is emphasized; and controlling a face of the first avatar object based on the changed face data.

The above-mentioned and other objects, features, aspects, and advantages of the disclosure may be made clear from the following detailed description of this disclosure, which is to be understood in association with the attached drawings.

BRIEF DESCRIPTION OF THE DRAWINGS

FIG. 9 A block diagram of a hardware configuration of a server according to at least one embodiment of this disclosure.

FIG. 11 A sequence chart of processing to be executed by a system including an HMD set according to at least one embodiment of this disclosure.

FIG. 13 A sequence diagram of processing to be executed by a system including an HMD interacting in a network according to at least one embodiment of this disclosure.

FIG. 18A A diagram of a facial expression of the user in a real space according to at least one embodiment of this disclosure.

FIG. 18B A diagram of a facial expression of an avatar object of the user in the virtual space according to at least one embodiment of this disclosure.

FIG. 24A A diagram of a facial expression of a user having increased motions of a mouth in a real space according to at least one embodiment of this disclosure.

FIG. 24B A diagram of a facial expression of an avatar object of the user in the virtual space reflecting the increased motions in the avatar object according to at least one embodiment of this disclosure.

DETAILED DESCRIPTION

Now, with reference to the drawings, embodiments of this technical idea are described in detail. In the following description, like components are denoted by like reference symbols. The same applies to the names and functions of those components. Therefore, detailed description of those components is not repeated. In one or more embodiments described in this disclosure, components of respective embodiments can be combined with each other, and the combination also serves as a part of the embodiments described in this disclosure.

[Configuration of HMD System]

Figure 1:
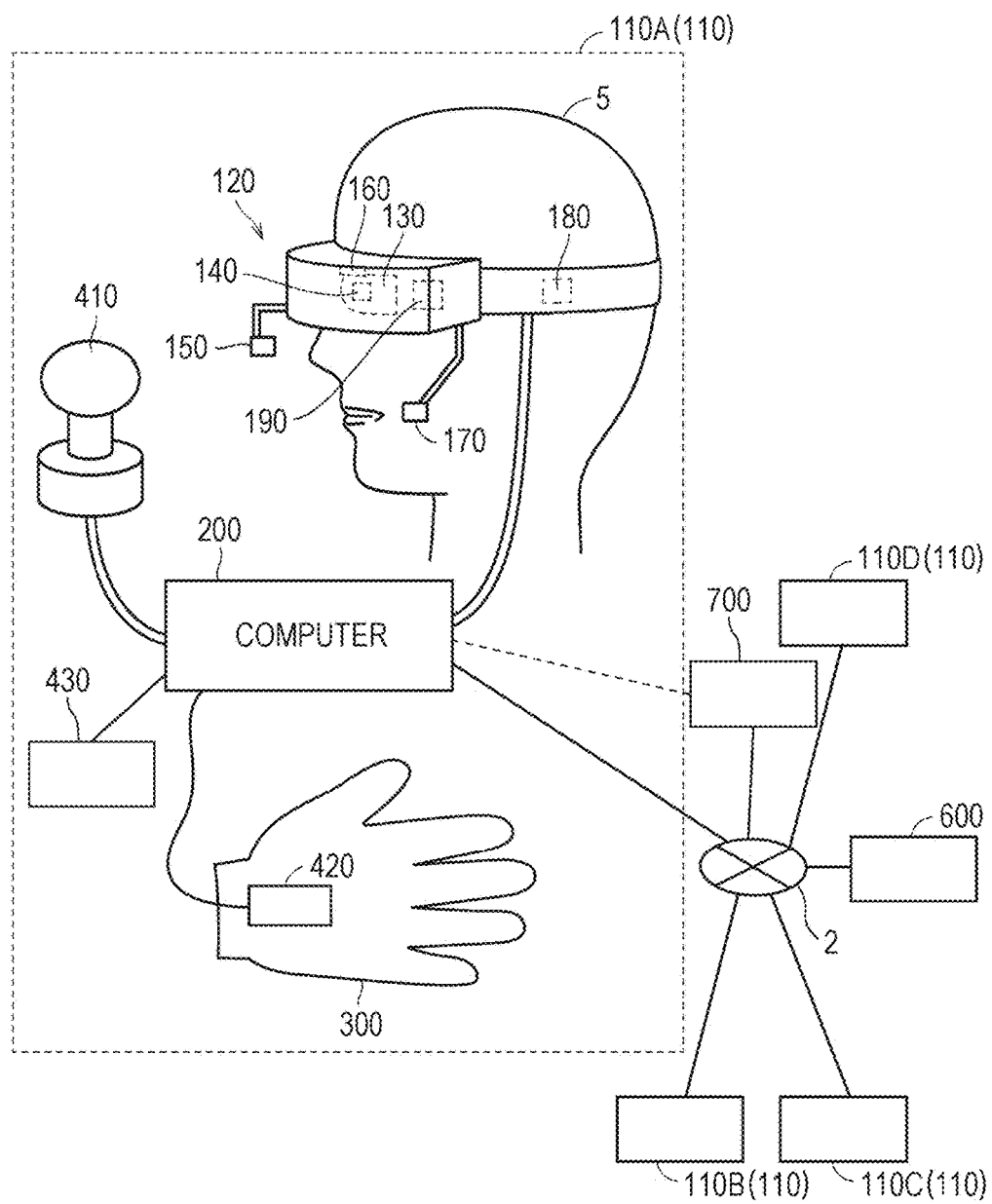
FIG. 1 A diagram of a system including a head-mounted device (HMD) according to at least one embodiment of this disclosure.

With reference to FIG. 1, a configuration of a head-mounted device (HMD) system 100 is described. FIG. 1 is a diagram of a system 100 including a head-mounted display (HMD) according to at least one embodiment of this disclosure. The system 100 is usable for household use or for professional use.

The system 100 includes a server 600, HMD sets 110A, 110B, 110C, and 110D, an external device 700, and a network 2. Each of the HMD sets 110A, 110B, 110C, and 110D is capable of independently communicating to/from the server 600 or the external device 700 via the network 2. In some instances, the HMD sets 110A, 110B, 110C, and 110D are also collectively referred to as "HMD set 110". The number of HMD sets 110 constructing the HMD system 100 is not limited to four, but may be three or less, or five or more. The HMD set 110 includes an HMD 120, a computer 200, an HMD sensor 410, a display 430, and a controller 300. The HMD 120 includes a monitor 130, an eye gaze sensor 140, a first camera 150, a second camera 160, a microphone 170, and a speaker 180. In at least one embodiment, the controller 300 includes a motion sensor 420.

In at least one aspect, the computer 200 is connected to the network 2, for example, the Internet, and is able to communicate to/from the server 600 or other computers connected to the network 2 in a wired or wireless manner. Examples of the other computers include a computer of another HMD set 110 or the external device 700. In at least one aspect, the HMD 120 includes a sensor 190 instead of the HMD sensor 410. In at least one aspect, the HMD 120 includes both sensor 190 and the HMD sensor 410.

The HMD 120 is wearable on a head of a user 5 to display a virtual space to the user 5 during operation. More specifically, in at least one embodiment, the HMD 120 displays each of a right-eye image and a left-eye image on the monitor 130. Each eye of the user 5 is able to visually recognize a corresponding image from the right-eye image and the left-eye image so that the user 5 may recognize a three-dimensional image based on the parallax of both of the user's the eyes. In at least one embodiment, the HMD 120 includes any one of a so-called head-mounted display including a monitor or a head-mounted device capable of mounting a smartphone or other terminals including a monitor.

The monitor 130 is implemented as, for example, a non-transmissive display device. In at least one aspect, the monitor 130 is arranged on a main body of the HMD 120 so as to be positioned in front of both the eyes of the user 5. Therefore, when the user 5 is able to visually recognize the three-dimensional image displayed by the monitor 130, the user 5 is immersed in the virtual space. In at least one aspect, the virtual space includes, for example, a background, objects that are operable by the user 5, or menu images that are selectable by the user 5. In at least one aspect, the monitor 130 is implemented as a liquid crystal monitor or an organic electroluminescence (EL) monitor included in a so-called smartphone or other information display terminals.

In at least one aspect, the monitor 130 is implemented as a transmissive display device. In this case, the user 5 is able to see through the HMD 120 covering the eyes of the user 5, for example, smartglasses. In at least one embodiment, the transmissive monitor 130 is configured as a temporarily non-transmissive display device through adjustment of a transmittance thereof. In at least one embodiment, the monitor 130 is configured to display a real space and a part of an image constructing the virtual space simultaneously. For example, in at least one embodiment, the monitor 130 displays an image of the real space captured by a camera mounted on the HMD 120, or may enable recognition of the real space by setting the transmittance of a part the monitor 130 sufficiently high to permit the user 5 to see through the HMD 120.

In at least one aspect, the monitor 130 includes a sub-monitor for displaying a right-eye image and a sub-monitor for displaying a left-eye image. In at least one aspect, the monitor 130 is configured to integrally display the right-eye image and the left-eye image. In this case, the monitor 130 includes a high-speed shutter. The high-speed shutter operates so as to alternately display the right-eye image to the right of the user 5 and the left-eye image to the left eye of the user 5, so that only one of the user's 5 eyes is able to recognize the image at any single point in time.

In at least one aspect, the HMD 120 includes a plurality of light sources (not shown). Each light source is implemented by, for example, a light emitting diode (LED) configured to emit an infrared ray. The HMD sensor 410 has a position tracking function for detecting the motion of the HMD 120. More specifically, the HMD sensor 410 reads a plurality of infrared rays emitted by the HMD 120 to detect the position and the inclination of the HMD 120 in the real space.

In at least one aspect, the HMD sensor 410 is implemented by a camera. In at least one aspect, the HMD sensor 410 uses image information of the HMD 120 output from the camera to execute image analysis processing, to thereby enable detection of the position and the inclination of the HMD 120.

In at least one aspect, the HMD 120 includes the sensor 190 instead of, or in addition to, the HMD sensor 410 as a position detector. In at least one aspect, the HMD 120 uses the sensor 190 to detect the position and the inclination of the HMD 120. For example, in at least one embodiment, when the sensor 190 is an angular velocity sensor, a geomagnetic sensor, or an acceleration sensor, the HMD 120 uses any or all of those sensors instead of (or in addition to) the HMD sensor 410 to detect the position and the inclination of the HMD 120. As an example, when the sensor 190 is an angular velocity sensor, the angular velocity sensor detects over time the angular velocity about each of three axes of the HMD 120 in the real space. The HMD 120 calculates a temporal change of the angle about each of the three axes of the HMD 120 based on each angular velocity, and further calculates an inclination of the HMD 120 based on the temporal change of the angles.

The eye gaze sensor 140 detects a direction in which the lines of sight of the right eye and the left eye of the user 5 are directed. That is, the eye gaze sensor 140 detects the line of sight of the user 5. The direction of the line of sight is detected by, for example, a known eye tracking function. The eye gaze sensor 140 is implemented by a sensor having the eye tracking function. In at least one aspect, the eye gaze sensor 140 includes a right-eye sensor and a left-eye sensor. In at least one embodiment, the eye gaze sensor 140 is, for example, a sensor configured to irradiate the right eye and the left eye of the user 5 with an infrared ray, and to receive reflection light from the cornea and the iris with respect to the irradiation light, to thereby detect a rotational angle of each of the user's 5 eyeballs. In at least one embodiment, the eye gaze sensor 140 detects the line of sight of the user 5 based on each detected rotational angle.

The first camera 150 photographs a lower part of a face of the user 5. More specifically, the first camera 150 photographs, for example, the nose or mouth of the user 5. The second camera 160 photographs, for example, the eyes and eyebrows of the user 5. A side of a casing of the HMD 120 on the user 5 side is defined as an interior side of the HMD 120, and a side of the casing of the HMD 120 on a side opposite to the user 5 side is defined as an exterior side of the HMD 120. In at least one aspect, the first camera 150 is arranged on an exterior side of the HMD 120, and the second camera 160 is arranged on an interior side of the HMD 120. Images generated by the first camera 150 and the second camera 160 are input to the computer 200. In at least one aspect, the first camera 150 and the second camera 160 are implemented as a single camera, and the face of the user 5 is photographed with this single camera.

The microphone 170 converts an utterance of the user 5 into a voice signal (electric signal) for output to the computer 200. The speaker 180 converts the voice signal into a voice for output to the user 5. In at least one embodiment, the speaker 180 converts other signals into audio information provided to the user 5. In at least one aspect, the HMD 120 includes earphones in place of the speaker 180.

The controller 300 is connected to the computer 200 through wired or wireless communication. The controller 300 receives input of a command from the user 5 to the computer 200. In at least one aspect, the controller 300 is held by the user 5. In at least one aspect, the controller 300 is mountable to the body or a part of the clothes of the user 5. In at least one aspect, the controller 300 is configured to output at least any one of a vibration, a sound, or light based on the signal transmitted from the computer 200. In at least one aspect, the controller 300 receives from the user 5 an operation for controlling the position and the motion of an object arranged in the virtual space.

In at least one aspect, the controller 300 includes a plurality of light sources. Each light source is implemented by, for example, an LED configured to emit an infrared ray. The HMD sensor 410 has a position tracking function. In this case, the HMD sensor 410 reads a plurality of infrared rays emitted by the controller 300 to detect the position and the inclination of the controller 300 in the real space. In at least one aspect, the HMD sensor 410 is implemented by a camera. In this case, the HMD sensor 410 uses image information of the controller 300 output from the camera to execute image analysis processing, to thereby enable detection of the position and the inclination of the controller 300.

In at least one aspect, the motion sensor 420 is mountable on the hand of the user 5 to detect the motion of the hand of the user 5. For example, the motion sensor 420 detects a rotational speed, a rotation angle, and the number of rotations of the hand. The detected signal is transmitted to the computer 200. The motion sensor 420 is provided to, for example, the controller 300. In at least one aspect, the motion sensor 420 is provided to, for example, the controller 300 capable of being held by the user 5. In at least one aspect, to help prevent accidently release of the controller 300 in the real space, the controller 300 is mountable on an object like a glove-type object that does not easily fly away by being worn on a hand of the user 5. In at least one aspect, a sensor that is not mountable on the user 5 detects the motion of the hand of the user 5. For example, a signal of a camera that photographs the user 5 may be input to the computer 200 as a signal representing the motion of the user 5. As at least one example, the motion sensor 420 and the computer 200 are connected to each other through wired or wireless communication. In the case of wireless communication, the communication mode is not particularly limited, and for example, Bluetooth (trademark) or other known communication methods are usable.

The display 430 displays an image similar to an image displayed on the monitor 130. With this, a user other than the user 5 wearing the HMD 120 can also view an image similar to that of the user 5. An image to be displayed on the display 430 is not required to be a three-dimensional image, but may be a right-eye image or a left-eye image. For example, a liquid crystal display or an organic EL monitor may be used as the display 430.

In at least one embodiment, the server 600 transmits a program to the computer 200. In at least one aspect, the server 600 communicates to/from another computer 200 for providing virtual reality to the HMD 120 used by another user. For example, when a plurality of users play a participatory game, for example, in an amusement facility, each computer 200 communicates to/from another computer 200 via the server 600 with a signal that is based on the motion of each user, to thereby enable the plurality of users to enjoy a common game in the same virtual space. Each computer 200 may communicate to/from another computer 200 with the signal that is based on the motion of each user without intervention of the server 600.

The external device 700 is any suitable device as long as the external device 700 is capable of communicating to/from the computer 200. The external device 700 is, for example, a device capable of communicating to/from the computer

200 via the network 2, or is a device capable of directly communicating to/from the computer 200 by near field communication or wired communication. Peripheral devices such as a smart device, a personal computer (PC), or the computer 200 are usable as the external device 700, in at least one embodiment, but the external device 700 is not limited thereto.

[Hardware Configuration of Computer]

Figure 2:
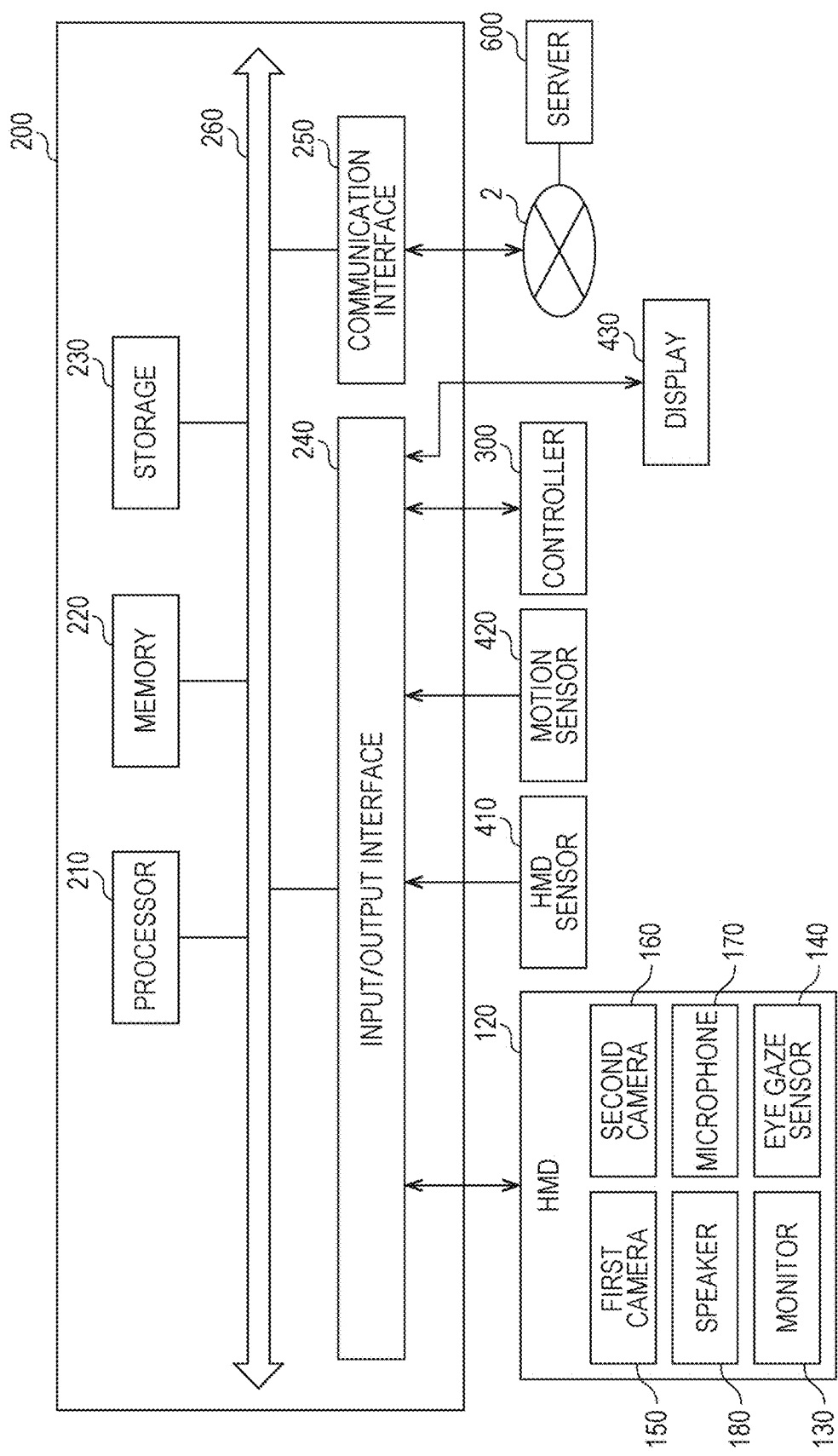
FIG. 2 A block diagram of a hardware configuration of a computer according to at least one embodiment of this disclosure.

With reference to FIG. 2, the computer 200 in at least one embodiment is described. FIG. 2 is a block diagram of a hardware configuration of the computer 200 according to at least one embodiment. The computer 200 includes, a processor 210, a memory 220, a storage 230, an input/output interface 240, and a communication interface 250. Each component is connected to a bus 260. In at least one embodiment, at least one of the processor 210, the memory 220, the storage 230, the input/output interface 240 or the communication interface 250 is part of a separate structure and communicates with other components of computer 200 through a communication path other than the bus 260.

The processor 210 executes a series of commands included in a program stored in the memory 220 or the storage 230 based on a signal transmitted to the computer 200 or in response to a condition determined in advance. In at least one aspect, the processor 210 is implemented as a central processing unit (CPU), a graphics processing unit (GPU), a micro-processor unit (MPU), a field-programmable gate array (FPGA), or other devices.

The memory 220 temporarily stores programs and data. The programs are loaded from, for example, the storage 230. The data includes data input to the computer 200 and data generated by the processor 210. In at least one aspect, the memory 220 is implemented as a random access memory (RAM) or other volatile memories.

The storage 230 permanently stores programs and data. In at least one embodiment, the storage 230 stores programs and data for a period of time longer than the memory 220, but not permanently. The storage 230 is implemented as, for example, a read-only memory (ROM), a hard disk device, a flash memory, or other non-volatile storage devices. The programs stored in the storage 230 include programs for providing a virtual space in the system 100, simulation programs, game programs, user authentication programs, and programs for implementing communication to/from other computers 200. The data stored in the storage 230 includes data and objects for defining the virtual space.

In at least one aspect, the storage 230 is implemented as a removable storage device like a memory card. In at least one aspect, a configuration that uses programs and data stored in an external storage device is used instead of the storage 230 built into the computer 200. With such a configuration, for example, in a situation in which a plurality of HMD systems 100 are used, for example in an amusement facility, the programs and the data are collectively updated.

The input/output interface 240 allows communication of signals among the HMD 120, the HMD sensor 410, the motion sensor 420, and the display 430. The monitor 130, the eye gaze sensor 140, the first camera 150, the second camera 160, the microphone 170, and the speaker 180 included in the HMD 120 may communicate to/from the computer 200 via the input/output interface 240 of the HMD 120. In at least one aspect, the input/output interface 240 is implemented with use of a universal serial bus (USB), a digital visual interface (DVI), a high-definition multimedia interface (HDMI) (trademark), or other terminals. The input/output interface 240 is not limited to the specific examples described above.

In at least one aspect, the input/output interface 240 further communicates to/from the controller 300. For example, the input/output interface 240 receives input of a signal output from the controller 300 and the motion sensor 420. In at least one aspect, the input/output interface 240 transmits a command output from the processor 210 to the controller 300. The command instructs the controller 300 to, for example, vibrate, output a sound, or emit light. When the controller 300 receives the command, the controller 300 executes any one of vibration, sound output, and light emission in accordance with the command.

The communication interface 250 is connected to the network 2 to communicate to/from other computers (e.g., server 600) connected to the network 2. In at least one aspect, the communication interface 250 is implemented as, for example, a local area network (LAN), other wired communication interfaces, wireless fidelity (Wi-Fi), Bluetooth®, near field communication (NFC), or other wireless communication interfaces. The communication interface 250 is not limited to the specific examples described above.

In at least one aspect, the processor 210 accesses the storage 230 and loads one or more programs stored in the storage 230 to the memory 220 to execute a series of commands included in the program. In at least one embodiment, the one or more programs includes an operating system of the computer 200, an application program for providing a virtual space, and/or game software that is executable in the virtual space. The processor 210 transmits a signal for providing a virtual space to the HMD 120 via the input/output interface 240. The HMD 120 displays a video on the monitor 130 based on the signal.

In FIG. 2, the computer 200 is outside of the HMD 120, but in at least one aspect, the computer 200 is integral with the HMD 120. As an example, a portable information communication terminal (e.g., smartphone) including the monitor 130 functions as the computer 200 in at least one embodiment.

In at least one embodiment, the computer 200 is used in common with a plurality of HMDs 120. With such a configuration, for example, the computer 200 is able to provide the same virtual space to a plurality of users, and hence each user can enjoy the same application with other users in the same virtual space.

According to at least one embodiment of this disclosure, in the system 100, a real coordinate system is set in advance. The real coordinate system is a coordinate system in the real space. The real coordinate system has three reference directions (axes) that are respectively parallel to a vertical direction, a horizontal direction orthogonal to the vertical direction, and a front-rear direction orthogonal to both of the vertical direction and the horizontal direction in the real space. The horizontal direction, the vertical direction (up-down direction), and the front-rear direction in the real coordinate system are defined as an x axis, a y axis, and a z axis, respectively. More specifically, the x axis of the real coordinate system is parallel to the horizontal direction of the real space, the y axis thereof is parallel to the vertical direction of the real space, and the z axis thereof is parallel to the front-rear direction of the real space.

In at least one aspect, the HMD sensor 410 includes an infrared sensor. When the infrared sensor detects the infrared ray emitted from each light source of the HMD 120, the infrared sensor detects the presence of the HMD 120. The HMD sensor 410 further detects the position and the inclination (direction) of the HMD 120 in the real space, which corresponds to the motion of the user 5 wearing the HMD 120, based on the value of each point (each coordinate value in the real coordinate system). In more detail, the HMD sensor 410 is able to detect the temporal change of the position and the inclination of the HMD 120 with use of each value detected over time.

Each inclination of the HMD 120 detected by the HMD sensor 410 corresponds to an inclination about each of the three axes of the HMD 120 in the real coordinate system. The HMD sensor 410 sets a uvw visual-field coordinate system to the HMD 120 based on the inclination of the HMD 120 in the real coordinate system. The uvw visual-field coordinate system set to the HMD 120 corresponds to a point-of-view coordinate system used when the user 5 wearing the HMD 120 views an object in the virtual space.

[Uvw Visual-Field Coordinate System]

Figure 3:
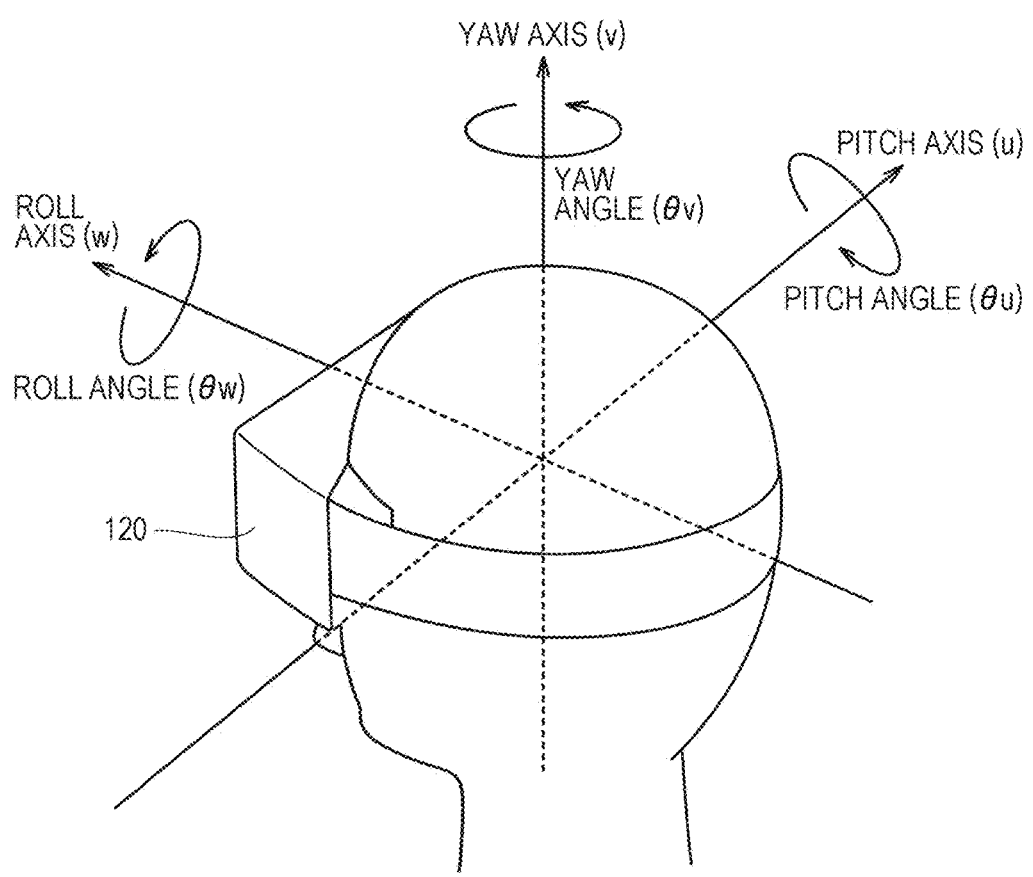
FIG. 3 A diagram of a uvw visual-field coordinate system to be set for an HMD according to at least one embodiment of this disclosure.

With reference to FIG. 3, the uvw visual-field coordinate system is described. FIG. 3 is a diagram of a uvw visual-field coordinate system to be set for the HMD 120 according to at least one embodiment of this disclosure. The HMD sensor 410 detects the position and the inclination of the HMD 120 in the real coordinate system when the HMD 120 is activated. The processor 210 sets the uvw visual-field coordinate system to the HMD 120 based on the detected values.

In FIG. 3, the HMD 120 sets the three-dimensional uvw visual-field coordinate system defining the head of the user 5 wearing the HMD 120 as a center (origin). More specifically, the HMD 120 sets three directions newly obtained by inclining the horizontal direction, the vertical direction, and the front-rear direction (x axis, y axis, and z axis), which define the real coordinate system, about the respective axes by the inclinations about the respective axes of the HMD 120 in the real coordinate system, as a pitch axis (u axis), a yaw axis (v axis), and a roll axis (w axis) of the uvw visual-field coordinate system in the HMD 120.

In at least one aspect, when the user 5 wearing the HMD 120 is standing (or sitting) upright and is visually recognizing the front side, the processor 210 sets the uvw visual-field coordinate system that is parallel to the real coordinate system to the HMD 120. In this case, the horizontal direction (x axis), the vertical direction (y axis), and the front-rear direction (z axis) of the real coordinate system directly match the pitch axis (u axis), the yaw axis (v axis), and the roll axis (w axis) of the uvw visual-field coordinate system in the HMD 120, respectively.

After the uvw visual-field coordinate system is set to the HMD 120, the HMD sensor 410 is able to detect the inclination of the HMD 120 in the set uvw visual-field coordinate system based on the motion of the HMD 120. In this case, the HMD sensor 410 detects, as the inclination of the HMD 120, each of a pitch angle ($\theta u$), a yaw angle ($\theta v$), and a roll angle ($\theta w$) of the HMD 120 in the uvw visual-field coordinate system. The pitch angle ($\theta u$) represents an inclination angle of the HMD 120 about the pitch axis in the uvw visual-field coordinate system. The yaw angle ($\theta v$) represents an inclination angle of the HMD 120 about the yaw axis in the uvw visual-field coordinate system. The roll angle ($\theta w$) represents an inclination angle of the HMD 120 about the roll axis in the uvw visual-field coordinate system.

The HMD sensor 410 sets, to the HMD 120, the uvw visual-field coordinate system of the HMD 120 obtained after the movement of the HMD 120 based on the detected inclination angle of the HMD 120. The relationship between the HMD 120 and the uvw visual-field coordinate system of the HMD 120 is constant regardless of the position and the inclination of the HMD 120. When the position and the inclination of the HMD 120 change, the position and the inclination of the uvw visual-field coordinate system of the HMD 120 in the real coordinate system change in synchronization with the change of the position and the inclination.

In at least one aspect, the HMD sensor 410 identifies the position of the HMD 120 in the real space as a position relative to the HMD sensor 410 based on the light intensity of the infrared ray or a relative positional relationship between a plurality of points (e.g., distance between points), which is acquired based on output from the infrared sensor. In at least one aspect, the processor 210 determines the origin of the uvw visual-field coordinate system of the HMD 120 in the real space (real coordinate system) based on the identified relative position.

[Virtual Space]

Figure 4:
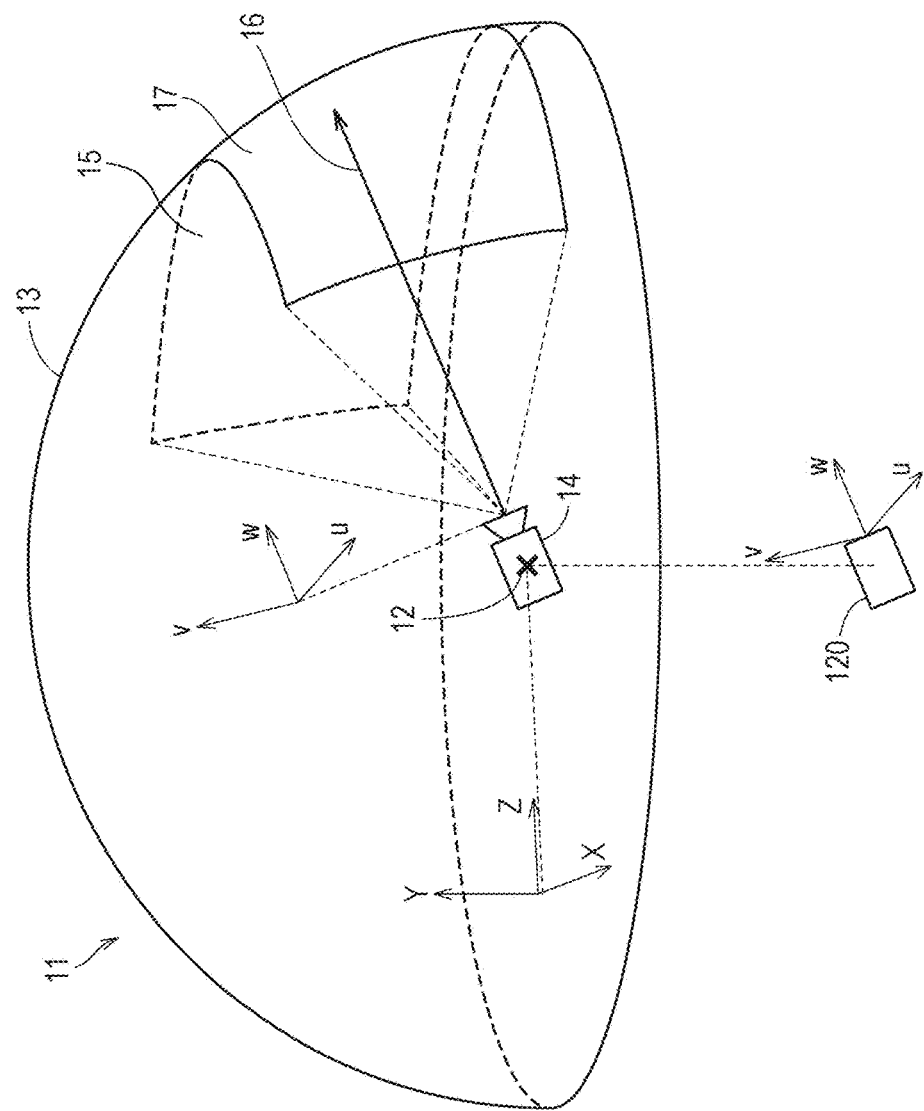
FIG. 4 A diagram of a mode of expressing a virtual space according to at least one embodiment of this disclosure.

With reference to FIG. 4, the virtual space is further described. FIG. 4 is a diagram of a mode of expressing a virtual space 11 according to at least one embodiment of this disclosure. The virtual space 11 has a structure with an entire celestial sphere shape covering a center 12 in all 360-degree directions. In FIG. 4, for the sake of clarity, only the upper-half celestial sphere of the virtual space 11 is included. Each mesh section is defined in the virtual space 11. The position of each mesh section is defined in advance as coordinate values in an XYZ coordinate system, which is a global coordinate system defined in the virtual space 11. The computer 200 associates each partial image forming a panorama image 13 (e.g., still image or moving image) that is developed in the virtual space 11 with each corresponding mesh section in the virtual space 11.

In at least one aspect, in the virtual space 11, the XYZ coordinate system having the center 12 as the origin is defined. The XYZ coordinate system is, for example, parallel to the real coordinate system. The horizontal direction, the vertical direction (up-down direction), and the front-rear direction of the XYZ coordinate system are defined as an X axis, a Y axis, and a Z axis, respectively. Thus, the X axis (horizontal direction) of the XYZ coordinate system is parallel to the x axis of the real coordinate system, the Y axis (vertical direction) of the XYZ coordinate system is parallel to the y axis of the real coordinate system, and the Z axis (front-rear direction) of the XYZ coordinate system is parallel to the z axis of the real coordinate system.

When the HMD 120 is activated, that is, when the HMD 120 is in an initial state, a virtual camera 14 is arranged at the center 12 of the virtual space 11. In at least one embodiment, the virtual camera 14 is offset from the center 12 in the initial state. In at least one aspect, the processor 210 displays on the monitor 130 of the HMD 120 an image photographed by the virtual camera 14. In synchronization with the motion of the HMD 120 in the real space, the virtual camera 14 similarly moves in the virtual space 11. With this, the change in position and direction of the HMD 120 in the real space is reproduced similarly in the virtual space 11.

The uvw visual-field coordinate system is defined in the virtual camera 14 similarly to the case of the HMD 120. The uvw visual-field coordinate system of the virtual camera 14 in the virtual space 11 is defined to be synchronized with the uvw visual-field coordinate system of the HMD 120 in the real space (real coordinate system). Therefore, when the inclination of the HMD 120 changes, the inclination of the virtual camera 14 also changes in synchronization therewith. The virtual camera 14 can also move in the virtual space 11 in synchronization with the movement of the user 5 wearing the HMD 120 in the real space.

The processor 210 of the computer 200 defines a field-of-view region 15 in the virtual space 11 based on the position and inclination (reference line of sight 16) of the virtual camera 14. The field-of-view region 15 corresponds to, of the virtual space 11, the region that is visually recognized by the user 5 wearing the HMD 120. That is, the position of the virtual camera 14 determines a point of view of the user 5 in the virtual space 11.

The line of sight of the user 5 detected by the eye gaze sensor 140 is a direction in the point-of-view coordinate system obtained when the user 5 visually recognizes an object. The uvw visual-field coordinate system of the HMD 120 is equal to the point-of-view coordinate system used when the user 5 visually recognizes the monitor 130. The uvw visual-field coordinate system of the virtual camera 14 is synchronized with the uvw visual-field coordinate system of the HMD 120. Therefore, in the system 100 in at least one aspect, the line of sight of the user 5 detected by the eye gaze sensor 140 can be regarded as the line of sight of the user 5 in the uvw visual-field coordinate system of the virtual camera 14.

[User's Line of Sight]

Figure 5:
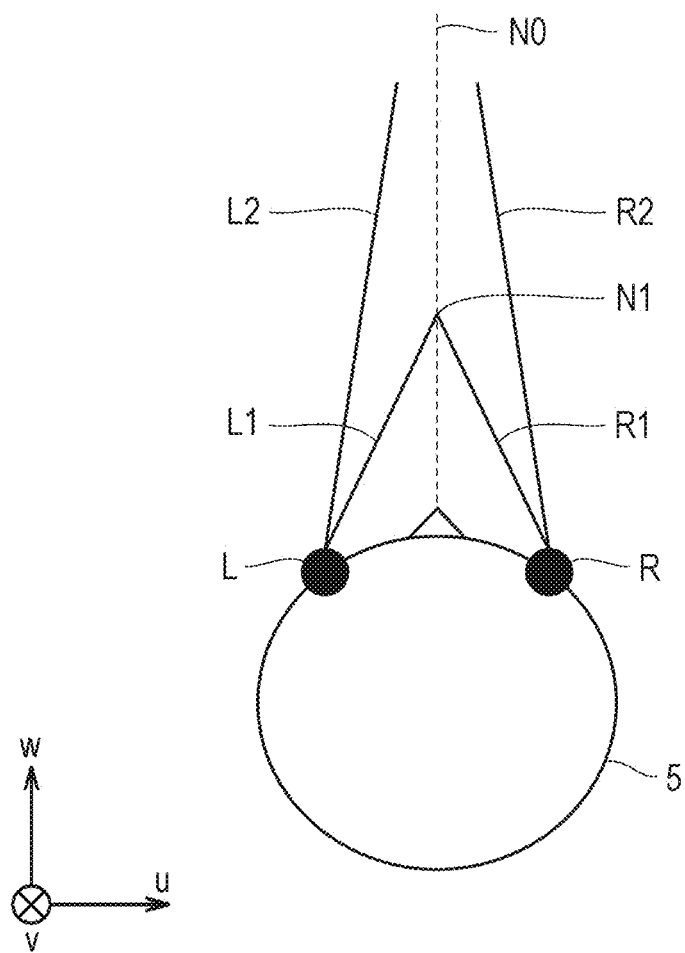
FIG. 5 A diagram of a plan view of a head of a user wearing the HMD according to at least one embodiment of this disclosure.

With reference to FIG. 5, determination of the line of sight of the user 5 is described. FIG. 5 is a plan view diagram of the head of the user 5 wearing the HMD 120 according to at least one embodiment of this disclosure.

In at least one aspect, the eye gaze sensor 140 detects lines of sight of the right eye and the left eye of the user 5. In at least one aspect, when the user 5 is looking at a near place, the eye gaze sensor 140 detects lines of sight R1 and L1. In at least one aspect, when the user 5 is looking at a far place, the eye gaze sensor 140 detects lines of sight R2 and L2. In this case, the angles formed by the lines of sight R2 and L2 with respect to the roll axis w are smaller than the angles formed by the lines of sight R1 and L1 with respect to the roll axis w. The eye gaze sensor 140 transmits the detection results to the computer 200.

When the computer 200 receives the detection values of the lines of sight R1 and L1 from the eye gaze sensor 140 as the detection results of the lines of sight, the computer 200 identifies a point of gaze N1 being an intersection of both the lines of sight R1 and L1 based on the detection values. Meanwhile, when the computer 200 receives the detection values of the lines of sight R2 and L2 from the eye gaze sensor 140, the computer 200 identifies an intersection of both the lines of sight R2 and L2 as the point of gaze. The computer 200 identifies a line of sight N0 of the user 5 based on the identified point of gaze N1. The computer 200 detects, for example, an extension direction of a straight line that passes through the point of gaze N1 and a midpoint of a straight line connecting a right eye R and a left eye L of the user 5 to each other as the line of sight N0. The line of sight N0 is a direction in which the user 5 actually directs his or her lines of sight with both eyes. The line of sight N0 corresponds to a direction in which the user 5 actually directs his or her lines of sight with respect to the field-of-view region 15.

In at least one aspect, the system 100 includes a television broadcast reception tuner. With such a configuration, the system 100 is able to display a television program in the virtual space 11.

In at least one aspect, the HMD system 100 includes a communication circuit for connecting to the Internet or has a verbal communication function for connecting to a telephone line or a cellular service.

[Field-of-View Region]

Figure 6:
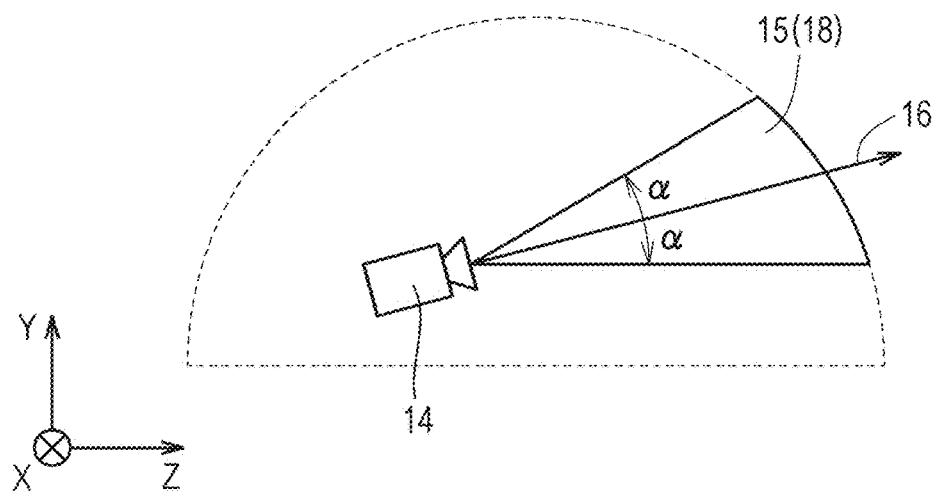
FIG. 6 A diagram of a YZ cross section obtained by viewing a field-of-view region from an X direction in the virtual space according to at least one embodiment of this disclosure.
Figure 7:
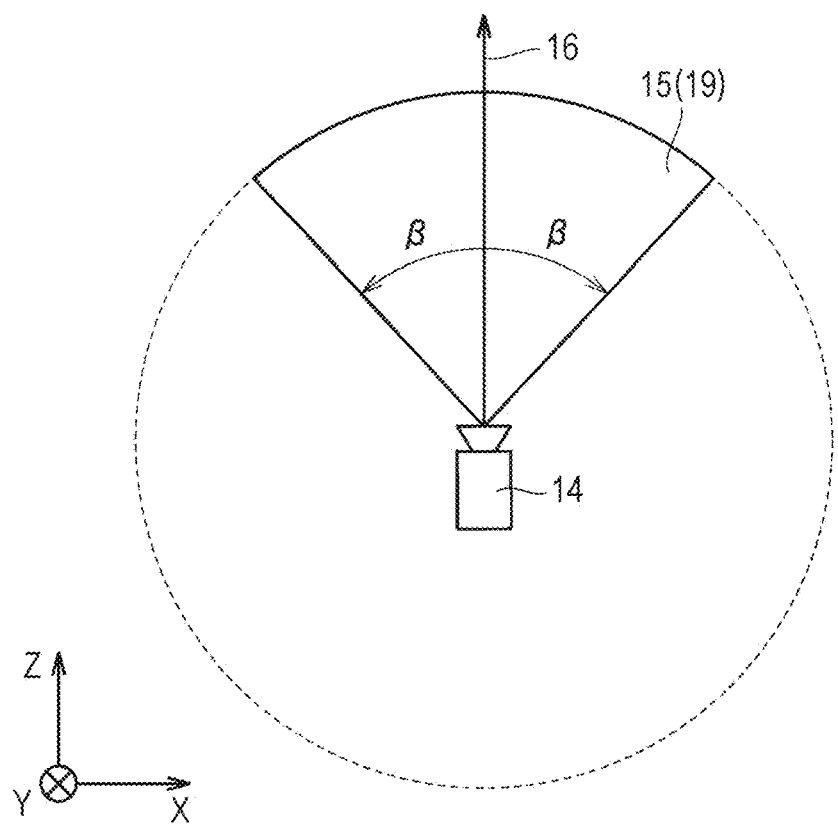
FIG. 7 A diagram of an XZ cross section obtained by viewing the field-of-view region from a Y direction in the virtual space according to at least one embodiment of this disclosure.

With reference to FIG. 6 and FIG. 7, the field-of-view region 15 is described. FIG. 6 is a diagram of a YZ cross section obtained by viewing the field-of-view region 15 from an X direction in the virtual space 11. FIG. 7 is a diagram of an XZ cross section obtained by viewing the field-of-view region 15 from a Y direction in the virtual space 11.

In FIG. 6, the field-of-view region 15 in the YZ cross section includes a region 18. The region 18 is defined by the position of the virtual camera 14, the reference line of sight 16, and the YZ cross section of the virtual space 11. The processor 210 defines a range of a polar angle α from the reference line of sight 16 serving as the center in the virtual space as the region 18.

In FIG. 7, the field-of-view region 15 in the XZ cross section includes a region 19. The region 19 is defined by the position of the virtual camera 14, the reference line of sight 16, and the XZ cross section of the virtual space 11. The processor 210 defines a range of an azimuth β from the reference line of sight 16 serving as the center in the virtual space 11 as the region 19. The polar angle α and β are determined in accordance with the position of the virtual camera 14 and the inclination (direction) of the virtual camera 14.

In at least one aspect, the system 100 causes the monitor 130 to display a field-of-view image 17 based on the signal from the computer 200, to thereby provide the field of view in the virtual space 11 to the user 5. The field-of-view image 17 corresponds to a part of the panorama image 13, which corresponds to the field-of-view region 15. When the user 5 moves the HMD 120 worn on his or her head, the virtual camera 14 is also moved in synchronization with the movement. As a result, the position of the field-of-view region 15 in the virtual space 11 is changed. With this, the field-of-view image 17 displayed on the monitor 130 is updated to an image of the panorama image 13, which is superimposed on the field-of-view region 15 synchronized with a direction in which the user 5 faces in the virtual space 11. The user 5 can visually recognize a desired direction in the virtual space 11.

In this way, the inclination of the virtual camera 14 corresponds to the line of sight of the user 5 (reference line of sight 16) in the virtual space 11, and the position at which the virtual camera 14 is arranged corresponds to the point of view of the user 5 in the virtual space 11. Therefore, through the change of the position or inclination of the virtual camera 14, the image to be displayed on the monitor 130 is updated, and the field of view of the user 5 is moved.

While the user 5 is wearing the HMD 120 (having a non-transmissive monitor 130), the user 5 can visually recognize only the panorama image 13 developed in the virtual space 11 without visually recognizing the real world. Therefore, the system 100 provides a high sense of immersion in the virtual space 11 to the user 5.

In at least one aspect, the processor 210 moves the virtual camera 14 in the virtual space 11 in synchronization with the movement in the real space of the user 5 wearing the HMD 120. In this case, the processor 210 identifies an image region to be projected on the monitor 130 of the HMD 120 (field-of-view region 15) based on the position and the direction of the virtual camera 14 in the virtual space 11.

In at least one aspect, the virtual camera 14 includes two virtual cameras, that is, a virtual camera for providing a right-eye image and a virtual camera for providing a left-eye image. An appropriate parallax is set for the two virtual cameras so that the user 5 is able to recognize the three-dimensional virtual space 11. In at least one aspect, the virtual camera 14 is implemented by a single virtual camera. In this case, a right-eye image and a left-eye image may be generated from an image acquired by the single virtual camera. In at least one embodiment, the virtual camera 14 is assumed to include two virtual cameras, and the roll axes of the two virtual cameras are synthesized so that the generated roll axis (w) is adapted to the roll axis (w) of the HMD 120.

[Controller]

Figure 8A:
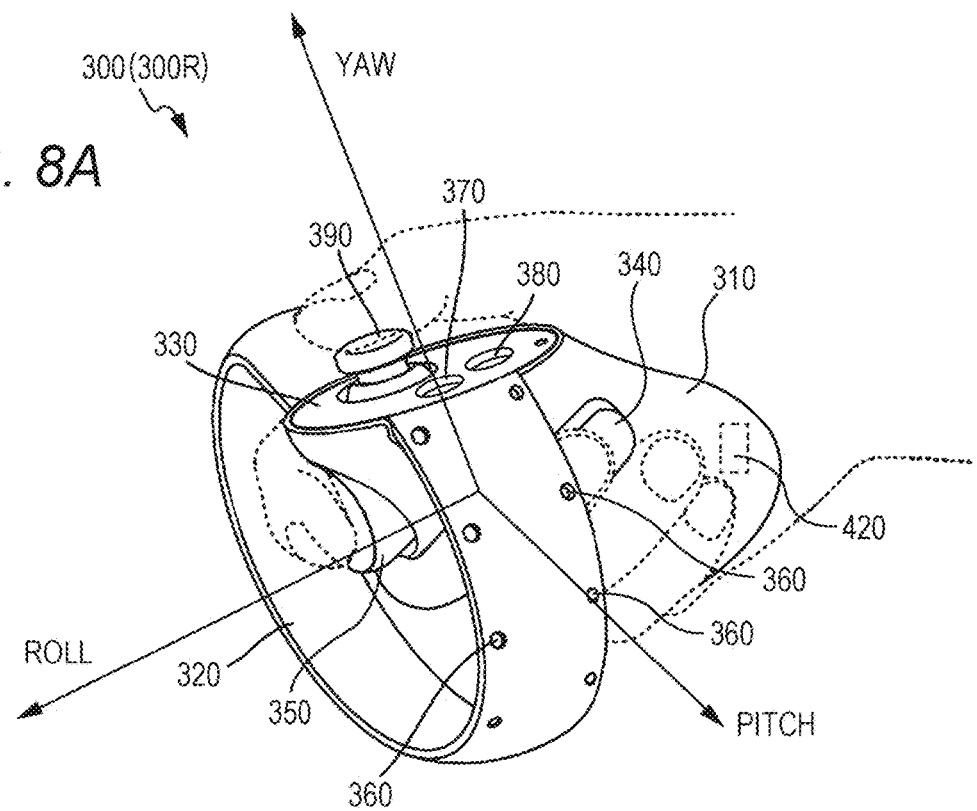
FIG. 8A A diagram of a schematic configuration of a controller according to at least one embodiment of this disclosure.
Figure 8B:
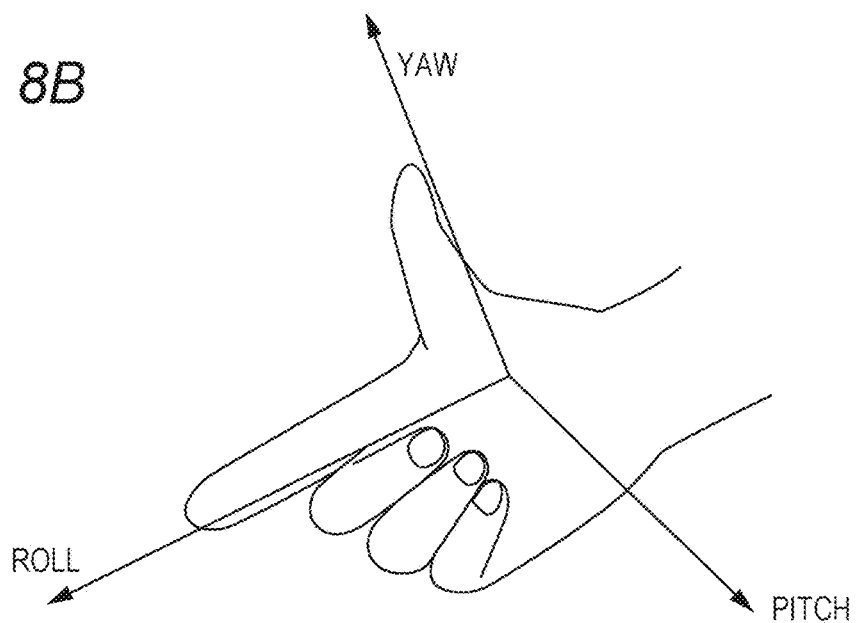
FIG. 8B A diagram of a coordinate system to be set for a hand of a user holding the controller according to at least one embodiment of this disclosure.

An example of the controller 300 is described with reference to FIG. 8A and FIG. 8B. FIG. 8A is a diagram of a schematic configuration of a controller according to at least one embodiment of this disclosure. FIG. 8B is a diagram of a coordinate system to be set for a hand of a user holding the controller according to at least one embodiment of this disclosure.

In at least one aspect, the controller 300 includes a right controller 300R and a left controller (not shown). In FIG. 8A only right controller 300R is shown for the sake of clarity. The right controller 300R is operable by the right hand of the user 5. The left controller is operable by the left hand of the user 5. In at least one aspect, the right controller 300R and the left controller are symmetrically configured as separate devices. Therefore, the user 5 can freely move his or her right hand holding the right controller 300R and his or her left hand holding the left controller. In at least one aspect, the controller 300 may be an integrated controller configured to receive an operation performed by both the right and left hands of the user 5. The right controller 300R is now described.

The right controller 300R includes a grip 310, a frame 320, and a top surface 330. The grip 310 is configured so as to be held by the right hand of the user 5. For example, the grip 310 may be held by the palm and three fingers (e.g., middle finger, ring finger, and small finger) of the right hand of the user 5.

The grip 310 includes buttons 340 and 350 and the motion sensor 420. The button 340 is arranged on a side surface of the grip 310, and receives an operation performed by, for example, the middle finger of the right hand. The button 350 is arranged on a front surface of the grip 310, and receives an operation performed by, for example, the index finger of the right hand. In at least one aspect, the buttons 340 and 350 are configured as trigger type buttons. The motion sensor 420 is built into the casing of the grip 310. When a motion of the user 5 can be detected from the surroundings of the user 5 by a camera or other device. In at least one embodiment, the grip 310 does not include the motion sensor 420.

The frame 320 includes a plurality of infrared LEDs 360 arranged in a circumferential direction of the frame 320. The infrared LEDs 360 emit, during execution of a program using the controller 300, infrared rays in accordance with progress of the program. The infrared rays emitted from the infrared LEDs 360 are usable to independently detect the position and the posture (inclination and direction) of each of the right controller 300R and the left controller. In FIG. 8A, the infrared LEDs 360 are shown as being arranged in two rows, but the number of arrangement rows is not limited to that illustrated in FIG. 8. In at least one embodiment, the infrared LEDs 360 are arranged in one row or in three or more rows. In at least one embodiment, the infrared LEDs 360 are arranged in a pattern other than rows.

The top surface 330 includes buttons 370 and 380 and an analog stick 390. The buttons 370 and 380 are configured as push type buttons. The buttons 370 and 380 receive an operation performed by the thumb of the right hand of the user 5. In at least one aspect, the analog stick 390 receives an operation performed in any direction of 360 degrees from an initial position (neutral position). The operation includes, for example, an operation for moving an object arranged in the virtual space 11.

In at least one aspect, each of the right controller 300R and the left controller includes a battery for driving the infrared ray LEDs 360 and other members. The battery includes, for example, a rechargeable battery, a button battery, a dry battery, but the battery is not limited thereto. In at least one aspect, the right controller 300R and the left controller are connectable to, for example, a USB interface of the computer 200. In at least one embodiment, the right controller 300R and the left controller do not include a battery.

In FIG. 8A and FIG. 8B, for example, a yaw direction, a roll direction, and a pitch direction are defined with respect to the right hand of the user 5. A direction of an extended thumb is defined as the yaw direction, a direction of an extended index finger is defined as the roll direction, and a direction perpendicular to a plane is defined as the pitch direction.

[Hardware Configuration of Server]

With reference to FIG. 9, the server 600 in at least one embodiment is described. FIG. 9 is a block diagram of a hardware configuration of the server 600 according to at least one embodiment of this disclosure. The server 600 includes a processor 610, a memory 620, a storage 630, an input/output interface 640, and a communication interface 650. Each component is connected to a bus 660. In at least one embodiment, at least one of the processor 610, the memory 620, the storage 630, the input/output interface 640 or the communication interface 650 is part of a separate structure and communicates with other components of server 600 through a communication path other than the bus 660.

The processor 610 executes a series of commands included in a program stored in the memory 620 or the storage 630 based on a signal transmitted to the server 600 or on satisfaction of a condition determined in advance. In at least one aspect, the processor 610 is implemented as a central processing unit (CPU), a graphics processing unit (GPU), a micro processing unit (MPU), a field-programmable gate array (FPGA), or other devices.

The memory 620 temporarily stores programs and data. The programs are loaded from, for example, the storage 630. The data includes data input to the server 600 and data generated by the processor 610. In at least one aspect, the memory 620 is implemented as a random access memory (RAM) or other volatile memories.

The storage 630 permanently stores programs and data. In at least one embodiment, the storage 630 stores programs and data for a period of time longer than the memory 620, but not permanently. The storage 630 is implemented as, for example, a read-only memory (ROM), a hard disk device, a flash memory, or other non-volatile storage devices. The programs stored in the storage 630 include programs for providing a virtual space in the system 100, simulation programs, game programs, user authentication programs, and programs for implementing communication to/from other computers 200 or servers 600. The data stored in the storage 630 may include, for example, data and objects for defining the virtual space.

In at least one aspect, the storage 630 is implemented as a removable storage device like a memory card. In at least one aspect, a configuration that uses programs and data stored in an external storage device is used instead of the storage 630 built into the server 600. With such a configuration, for example, in a situation in which a plurality of HMD systems 100 are used, for example, as in an amusement facility, the programs and the data are collectively updated.

The input/output interface 640 allows communication of signals to/from an input/output device. In at least one aspect, the input/output interface 640 is implemented with use of a USB, a DVI, an HDMI, or other terminals. The input/output interface 640 is not limited to the specific examples described above.

The communication interface 650 is connected to the network 2 to communicate to/from the computer 200 connected to the network 2. In at least one aspect, the communication interface 650 is implemented as, for example, a LAN, other wired communication interfaces, Wi-Fi, Bluetooth, NFC, or other wireless communication interfaces. The communication interface 650 is not limited to the specific examples described above.

In at least one aspect, the processor 610 accesses the storage 630 and loads one or more programs stored in the storage 630 to the memory 620 to execute a series of commands included in the program. In at least one embodiment, the one or more programs include, for example, an operating system of the server 600, an application program for providing a virtual space, and game software that can be executed in the virtual space. In at least one embodiment, the processor 610 transmits a signal for providing a virtual space to the HMD device 110 to the computer 200 via the input/output interface 640.

[Control Device of HMD]

Figure 10:
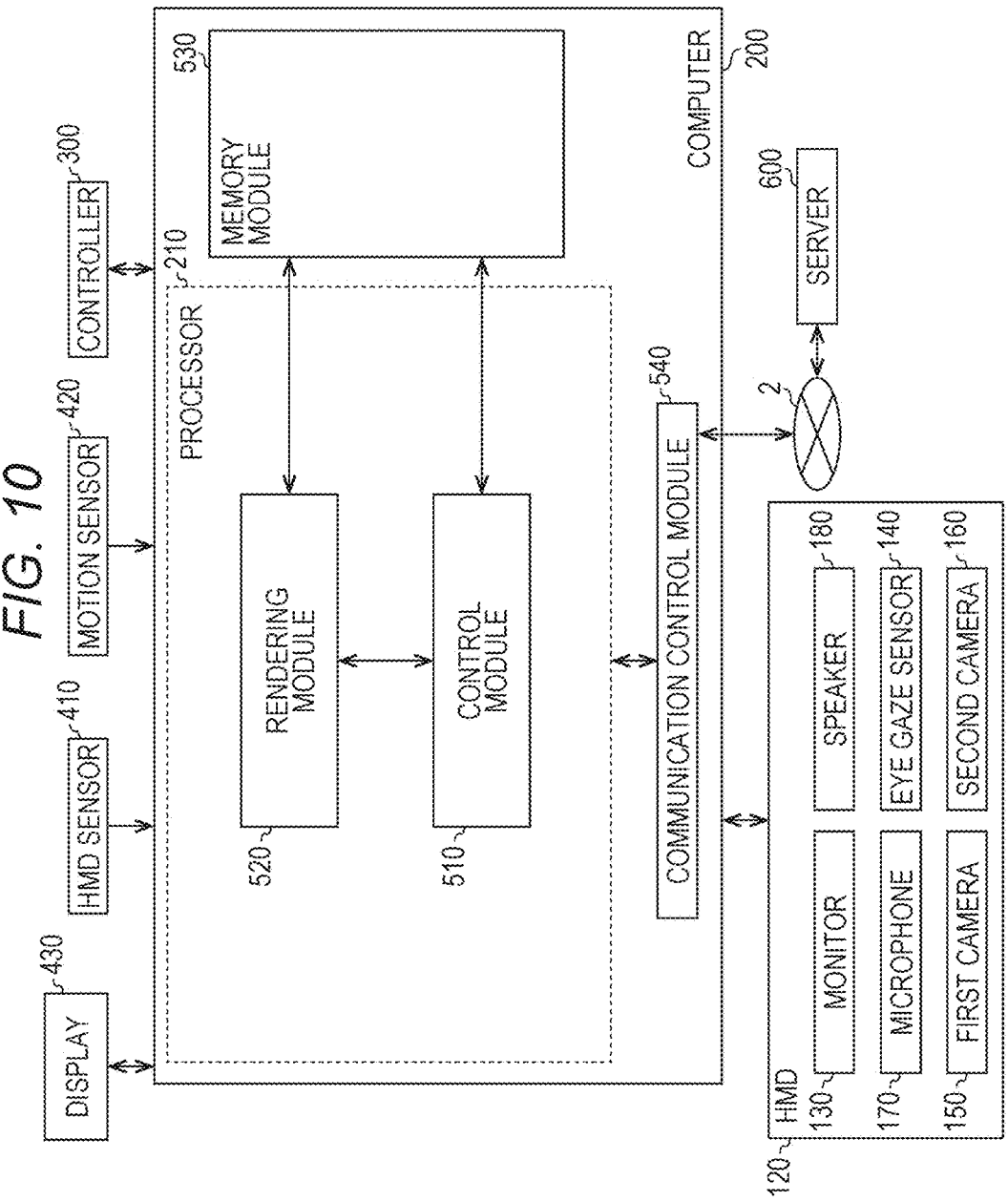
FIG. 10 A block diagram of a computer according to at least one embodiment of this disclosure.

With reference to FIG. 10, the control device of the HMD 120 is described. According to at least one embodiment of this disclosure, the control device is implemented by the computer 200 having a known configuration. FIG. 10 is a block diagram of the computer 200 according to at least one embodiment of this disclosure. FIG. 10 includes a module configuration of the computer 200.

In FIG. 10, the computer 200 includes a control module 510, a rendering module 520, a memory module 530, and a communication control module 540. In at least one aspect, the control module 510 and the rendering module 520 are implemented by the processor 210. In at least one aspect, a plurality of processors 210 function as the control module 510 and the rendering module 520. The memory module 530 is implemented by the memory 220 or the storage 230. The communication control module 540 is implemented by the communication interface 250.

The control module 510 controls the virtual space 11 provided to the user 5. The control module 510 defines the virtual space 11 in the HMD system 100 using virtual space data representing the virtual space 11. The virtual space data is stored in, for example, the memory module 530. In at least one embodiment, the control module 510 generates virtual space data. In at least one embodiment, the control module 510 acquires virtual space data from, for example, the server 600.

The control module 510 arranges objects in the virtual space 11 using object data representing objects. The object data is stored in, for example, the memory module 530. In at least one embodiment, the control module 510 generates virtual space data. In at least one embodiment, the control module 510 acquires virtual space data from, for example, the server 600. In at least one embodiment, the objects include, for example, an avatar object of the user 5, character objects, operation objects, for example, a virtual hand to be operated by the controller 300, and forests, mountains, other landscapes, streetscapes, or animals to be arranged in accordance with the progression of the story of the game.

The control module 510 arranges an avatar object of the user 5 of another computer 200, which is connected via the network 2, in the virtual space 11. In at least one aspect, the control module 510 arranges an avatar object of the user 5 in the virtual space 11. In at least one aspect, the control module 510 arranges an avatar object simulating the user 5 in the virtual space 11 based on an image including the user 5. In at least one aspect, the control module 510 arranges an avatar object in the virtual space 11, which is selected by the user 5 from among a plurality of types of avatar objects (e.g., objects simulating animals or objects of deformed humans).

The control module 510 identifies an inclination of the HMD 120 based on output of the HMD sensor 410. In at least one aspect, the control module 510 identifies an inclination of the HMD 120 based on output of the sensor 190 functioning as a motion sensor. The control module 510 detects parts (e.g., mouth, eyes, and eyebrows) forming the face of the user 5 from a face image of the user 5 generated by the first camera 150 and the second camera 160. The control module 510 detects a motion (shape) of each detected part.

The control module 510 detects a line of sight of the user 5 in the virtual space 11 based on a signal from the eye gaze sensor 140. The control module 510 detects a point-of-view position (coordinate values in the XYZ coordinate system) at which the detected line of sight of the user 5 and the celestial sphere of the virtual space 11 intersect with each other. More specifically, the control module 510 detects the point-of-view position based on the line of sight of the user 5 defined in the uvw coordinate system and the position and the inclination of the virtual camera 14. The control module 510 transmits the detected point-of-view position to the server 600. In at least one aspect, the control module 510 is configured to transmit line-of-sight information representing the line of sight of the user 5 to the server 600. In such a case, the control module 510 may calculate the point-of-view position based on the line-of-sight information received by the server 600.

The control module 510 translates a motion of the HMD 120, which is detected by the HMD sensor 410, in an avatar object. For example, the control module 510 detects inclination of the HMD 120, and arranges the avatar object in an inclined manner. The control module 510 translates the detected motion of face parts in a face of the avatar object arranged in the virtual space 11. The control module 510 receives line-of-sight information of another user 5 from the server 600, and translates the line-of-sight information in the line of sight of the avatar object of another user 5. In at least one aspect, the control module 510 translates a motion of the controller 300 in an avatar object and an operation object. In this case, the controller 300 includes, for example, a motion sensor, an acceleration sensor, or a plurality of light emitting elements (e.g., infrared LEDs) for detecting a motion of the controller 300.

The control module 510 arranges, in the virtual space 11, an operation object for receiving an operation by the user 5 in the virtual space 11. The user 5 operates the operation object to, for example, operate an object arranged in the virtual space 11. In at least one aspect, the operation object includes, for example, a hand object serving as a virtual hand corresponding to a hand of the user 5. In at least one aspect, the control module 510 moves the hand object in the virtual space 11 so that the hand object moves in association with a motion of the hand of the user 5 in the real space based on output of the motion sensor 420. In at least one aspect, the operation object may correspond to a hand part of an avatar object.

When one object arranged in the virtual space 11 collides with another object, the control module 510 detects the collision. The control module 510 is able to detect, for example, a timing at which a collision area of one object and a collision area of another object have touched with each other, and performs predetermined processing in response to the detected timing. In at least one embodiment, the control module 510 detects a timing at which an object and another object, which have been in contact with each other, have moved away from each other, and performs predetermined processing in response to the detected timing. In at least one embodiment, the control module 510 detects a state in which an object and another object are in contact with each other. For example, when an operation object touches another object, the control module 510 detects the fact that the operation object has touched the other object, and performs predetermined processing.

In at least one aspect, the control module 510 controls image display of the HMD 120 on the monitor 130. For example, the control module 510 arranges the virtual camera 14 in the virtual space 11. The control module 510 controls the position of the virtual camera 14 and the inclination (direction) of the virtual camera 14 in the virtual space 11. The control module 510 defines the field-of-view region 15 depending on an inclination of the head of the user 5 wearing the HMD 120 and the position of the virtual camera 14. The rendering module 520 generates the field-of-view region 17 to be displayed on the monitor 130 based on the determined field-of-view region 15. The communication control module 540 outputs the field-of-view region 17 generated by the rendering module 520 to the HMD 120.

The control module 510, which has detected an utterance of the user 5 using the microphone 170 from the HMD 120, identifies the computer 200 to which voice data corresponding to the utterance is to be transmitted. The voice data is transmitted to the computer 200 identified by the control module 510. The control module 510, which has received voice data from the computer 200 of another user via the network 2, outputs audio information (utterances) corresponding to the voice data from the speaker 180.

The memory module 530 holds data to be used to provide the virtual space 11 to the user 5 by the computer 200. In at least one aspect, the memory module 530 stores space information, object information, and user information.

The space information stores one or more templates defined to provide the virtual space 11.

The object information stores a plurality of panorama images 13 forming the virtual space 11 and object data for arranging objects in the virtual space 11. In at least one embodiment, the panorama image 13 contains a still image and/or a moving image. In at least one embodiment, the panorama image 13 contains an image in a non-real space and/or an image in the real space. An example of the image in a non-real space is an image generated by computer graphics.

The user information stores a user ID for identifying the user 5. The user ID is, for example, an internet protocol (IP) address or a media access control (MAC) address set to the computer 200 used by the user. In at least one aspect, the user ID is set by the user. The user information stores, for example, a program for causing the computer 200 to function as the control device of the HMD system 100.

The data and programs stored in the memory module 530 are input by the user 5 of the HMD 120. Alternatively, the processor 210 downloads the programs or data from a computer (e.g., server 600) that is managed by a business operator providing the content, and stores the downloaded programs or data in the memory module 530.

In at least one embodiment, the communication control module 540 communicates to/from the server 600 or other information communication devices via the network 2.

In at least one aspect, the control module 510 and the rendering module 520 are implemented with use of, for example, Unity® provided by Unity Technologies. In at least one aspect, the control module 510 and the rendering module 520 are implemented by combining the circuit elements for implementing each step of processing.

The processing performed in the computer 200 is implemented by hardware and software executed by the processor 410. In at least one embodiment, the software is stored in advance on a hard disk or other memory module 530. In at least one embodiment, the software is stored on a CD-ROM or other computer-readable non-volatile data recording media, and distributed as a program product. In at least one embodiment, the software may is provided as a program product that is downloadable by an information provider connected to the Internet or other networks. Such software is read from the data recording medium by an optical disc drive device or other data reading devices, or is downloaded from the server 600 or other computers via the communication control module 540 and then temporarily stored in a storage module. The software is read from the storage module by the processor 210, and is stored in a RAM in a format of an executable program. The processor 210 executes the program.

[Control Structure of HMD System]

With reference to FIG. 11, the control structure of the HMD set 110 is described. FIG. 11 is a sequence chart of processing to be executed by the system 100 according to at least one embodiment of this disclosure.

In FIG. 11, in Step S1110, the processor 210 of the computer 200 serves as the control module 510 to identify virtual space data and define the virtual space 11.

In Step S1120, the processor 210 initializes the virtual camera 14. For example, in a work area of the memory, the processor 210 arranges the virtual camera 14 at the center 12 defined in advance in the virtual space 11, and matches the line of sight of the virtual camera 14 with the direction in which the user 5 faces.

In Step S1130, the processor 210 serves as the rendering module 520 to generate field-of-view image data for displaying an initial field-of-view image. The generated field-of-view image data is output to the HMD 120 by the communication control module 540.

In Step S1132, the monitor 130 of the HMD 120 displays the field-of-view image based on the field-of-view image data received from the computer 200. The user 5 wearing the HMD 120 is able to recognize the virtual space 11 through visual recognition of the field-of-view image.

In Step S1134, the HMD sensor 410 detects the position and the inclination of the HMD 120 based on a plurality of infrared rays emitted from the HMD 120. The detection results are output to the computer 200 as motion detection data.

In Step S1140, the processor 210 identifies a field-of-view direction of the user 5 wearing the HMD 120 based on the position and inclination contained in the motion detection data of the HMD 120.

In Step S1150, the processor 210 executes an application program, and arranges an object in the virtual space 11 based on a command contained in the application program.

In Step S1160, the controller 300 detects an operation by the user 5 based on a signal output from the motion sensor 420, and outputs detection data representing the detected operation to the computer 200. In at least one aspect, an operation of the controller 300 by the user 5 is detected based on an image from a camera arranged around the user 5.

In Step S1170, the processor 210 detects an operation of the controller 300 by the user 5 based on the detection data acquired from the controller 300.

In Step S1180, the processor 210 generates field-of-view image data based on the operation of the controller 300 by the user 5. The communication control module 540 outputs the generated field-of-view image data to the HMD 120.

In Step S1190, the HMD 120 updates a field-of-view image based on the received field-of-view image data, and displays the updated field-of-view image on the monitor 130.

[Avatar Object]

Figure 12A:
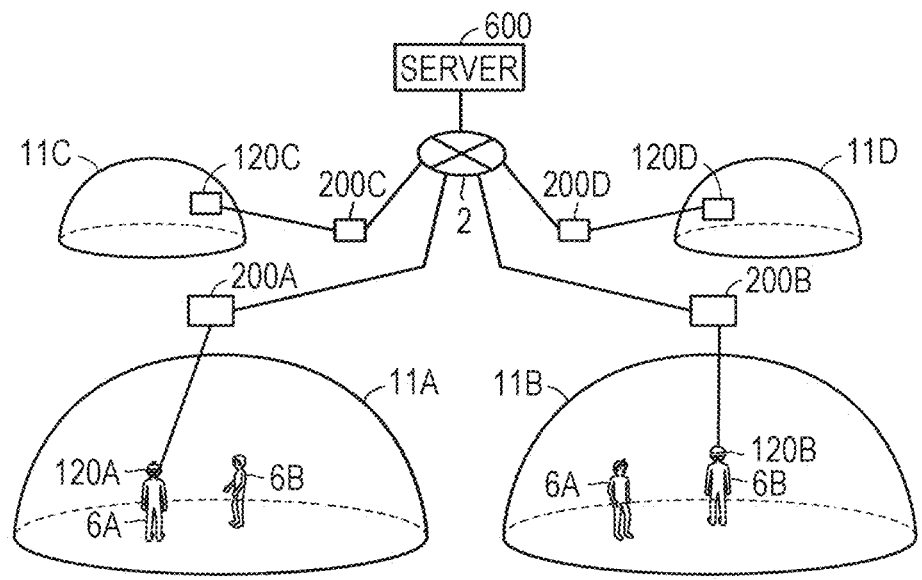
FIG. 12A A schematic diagram of HMD systems of several users sharing the virtual space interact using a network according to at least one embodiment of this disclosure.
Figure 12B:
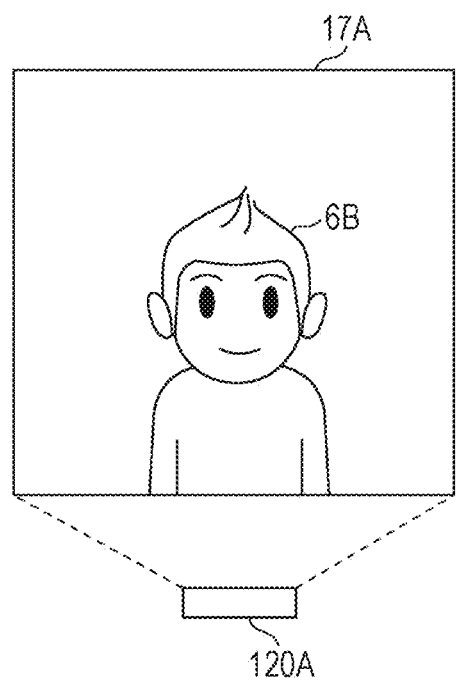
FIG. 12B A diagram of a field of view image of a HMD according to at least one embodiment of this disclosure.

With reference to FIG. 12A and FIG. 12B, an avatar object according to at least one embodiment is described. FIG. 12 and FIG. 12B are diagrams of avatar objects of respective users 5 of the HMD sets 110A and 110B. In the following, the user of the HMD set 110A, the user of the HMD set 110B, the user of the HMD set 110C, and the user of the HMD set 110D are referred to as "user 5A", "user 5B", "user 5C", and "user 5D", respectively. A reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively. For example, the HMD 120A is included in the HMD set 110A.

FIG. 12A is a schematic diagram of HMD systems of several users sharing the virtual space interact using a network according to at least one embodiment of this disclosure. Each HMD 120 provides the user 5 with the virtual space 11. Computers 200A to 200D provide the users 5A to 5D with virtual spaces 11A to 11D via HMDs 120A to 120D, respectively. In FIG. 12A, the virtual space 11A and the virtual space 11B are formed by the same data. In other words, the computer 200A and the computer 200B share the same virtual space. An avatar object 6A of the user 5A and an avatar object 6B of the user 5B are present in the virtual space 11A and the virtual space 11B. The avatar object 6A in the virtual space 11A and the avatar object 6B in the virtual space 11B each wear the HMD 120. However, the inclusion of the HMD 120A and HMD 120B is only for the sake of simplicity of description, and the avatars do not wear the HMD 120A and HMD 120B in the virtual spaces 11A and 11B, respectively.

In at least one aspect, the processor 210A arranges a virtual camera 14A for photographing a field-of-view region 17A of the user 5A at the position of eyes of the avatar object 6A.

FIG. 12B is a diagram of a field of view of a HMD according to at least one embodiment of this disclosure. FIG. 12(B) corresponds to the field-of-view region 17A of the user 5A in FIG. 12A. The field-of-view region 17A is an image displayed on a monitor 130A of the HMD 120A. This field-of-view region 17A is an image generated by the virtual camera 14A. The avatar object 6B of the user 5B is displayed in the field-of-view region 17A. Although not included in FIG. 12B, the avatar object 6A of the user 5A is displayed in the field-of-view image of the user 5B.

In the arrangement in FIG. 12B, the user 5A can communicate to/from the user 5B via the virtual space 11A through conversation. More specifically, voices of the user 5A acquired by a microphone 170A are transmitted to the HMD 120B of the user 5B via the server 600 and output from a speaker 180B provided on the HMD 120B. Voices of the user 5B are transmitted to the HMD 120A of the user 5A via the server 600, and output from a speaker 180A provided on the HMD 120A.

The processor 210A translates an operation by the user 5B (operation of HMD 120B and operation of controller 300B) in the avatar object 6B arranged in the virtual space 11A. With this, the user 5A is able to recognize the operation by the user 5B through the avatar object 6B.

FIG. 13 is a sequence chart of processing to be executed by the system 100 according to at least one embodiment of this disclosure. In FIG. 13, although the HMD set 110D is not included, the HMD set 110D operates in a similar manner as the HMD sets 110A, 110B, and 110C. Also in the following description, a reference numeral of each component related to the HMD set 110A, a reference numeral of each component related to the HMD set 110B, a reference numeral of each component related to the HMD set 110C, and a reference numeral of each component related to the HMD set 110D are appended by A, B, C, and D, respectively.

In Step S1310A, the processor 210A of the HMD set 110A acquires avatar information for determining a motion of the avatar object 6A in the virtual space 11A. This avatar information contains information on an avatar such as motion information, face tracking data, and sound data. The motion information contains, for example, information on a temporal change in position and inclination of the HMD 120A and information on a motion of the hand of the user 5A, which is detected by, for example, a motion sensor 420A. An example of the face tracking data is data identifying the position and size of each part of the face of the user 5A. Another example of the face tracking data is data representing motions of parts forming the face of the user 5A and line-of-sight data. An example of the sound data is data representing sounds of the user 5A acquired by the microphone 170A of the HMD 120A. In at least one embodiment, the avatar information contains information identifying the avatar object 6A or the user 5A associated with the avatar object 6A or information identifying the virtual space 11A accommodating the avatar object 6A. An example of the information identifying the avatar object 6A or the user 5A is a user ID. An example of the information identifying the virtual space 11A accommodating the avatar object 6A is a room ID. The processor 210A transmits the avatar information acquired as described above to the server 600 via the network 2.

In Step S1310B, the processor 210B of the HMD set 110B acquires avatar information for determining a motion of the avatar object 6B in the virtual space 11B, and transmits the avatar information to the server 600, similarly to the processing of Step S1310A. Similarly, in Step S1310C, the processor 210C of the HMD set 110C acquires avatar information for determining a motion of the avatar object 6C in the virtual space 11C, and transmits the avatar information to the server 600.

In Step S1320, the server 600 temporarily stores pieces of player information received from the HMD set 110A, the HMD set 110B, and the HMD set 110C, respectively. The server 600 integrates pieces of avatar information of all the users (in this example, users 5A to 5C) associated with the common virtual space 11 based on, for example, the user IDs and room IDs contained in respective pieces of avatar information. Then, the server 600 transmits the integrated pieces of avatar information to all the users associated with the virtual space 11 at a timing determined in advance. In this manner, synchronization processing is executed. Such synchronization processing enables the HMD set 110A, the HMD set 110B, and the HMD 120C to share mutual avatar information at substantially the same timing.

Next, the HMD sets 110A to 110C execute processing of Step S1330A to Step S1330C, respectively, based on the integrated pieces of avatar information transmitted from the server 600 to the HMD sets 110A to 110C. The processing of Step S1330A corresponds to the processing of Step S1180 of FIG. 11.

In Step S1330A, the processor 210A of the HMD set 110A updates information on the avatar object 6B and the avatar object 6C of the other users 5B and 5C in the virtual space 11A. Specifically, the processor 210A updates, for example, the position and direction of the avatar object 6B in the virtual space 11 based on motion information contained in the avatar information transmitted from the HMD set 110B. For example, the processor 210A updates the information (e.g., position and direction) on the avatar object 6B contained in the object information stored in the memory module 530. Similarly, the processor 210A updates the information (e.g., position and direction) on the avatar object 6C in the virtual space 11 based on motion information contained in the avatar information transmitted from the HMD set 110C.

In Step S1330B, similarly to the processing of Step S1330A, the processor 210B of the HMD set 110B updates information on the avatar object 6A and the avatar object 6C of the users 5A and 5C in the virtual space 11B. Similarly, in Step S1330C, the processor 210C of the HMD set 110C updates information on the avatar object 6A and the avatar object 6B of the users 5A and 5B in the virtual space 11C.

[Details of Module Configuration]

Figure 14:
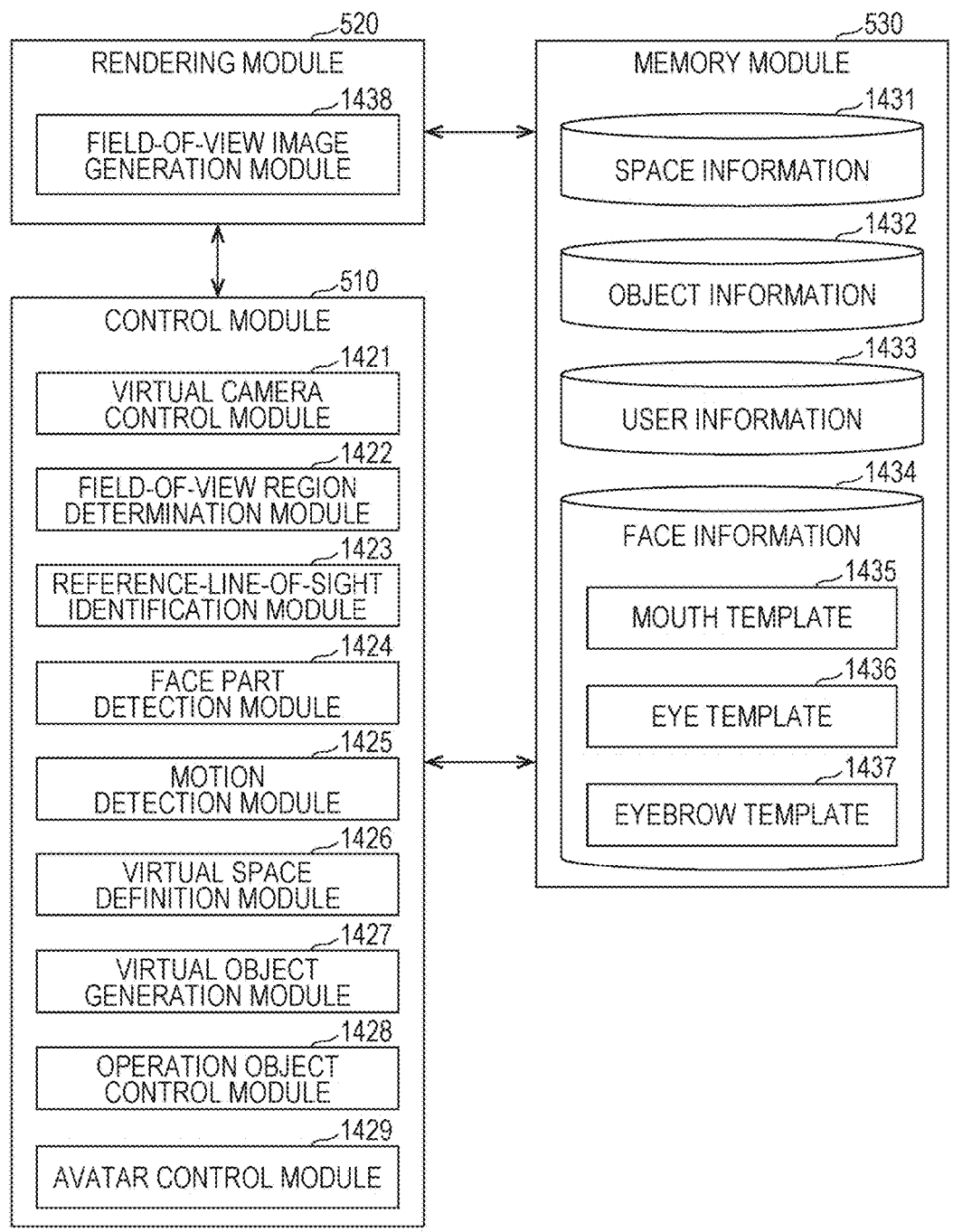
FIG. 14 A block diagram of a configuration of modules of the computer according to at least one embodiment of this disclosure.

With reference to FIG. 14, details of a module configuration of the computer 200 are described. FIG. 14 is a block diagram of a configuration of modules of the computer 200 according to at least one embodiment of this disclosure.

In FIG. 14, the control module 510 includes a virtual camera control module 1421, a field-of-view region determination module 1422, a reference-line-of-sight identification module 1423, a face part detection module 1424, a motion detection module 1425, a virtual space definition module 1426, a virtual object generation module 1427, an operation object control module 1428, and an avatar control module 1429. The rendering module 520 includes a field-of-view image generation module 1438. The memory module 530 stores space information 1431, object information 1432, user information 1433, and face information 1434.

The virtual camera control module 1421 arranges the virtual camera 14 in the virtual space 11. The virtual camera control module 1421 controls a position in the virtual space 11 at which the virtual camera 14 is arranged and the direction (inclination) of the virtual camera 14. The field-of-view region determination module 1422 determines the field of view region 15 based on the direction of the head of the user wearing the HMD 120 and the position at which the virtual camera 14 is arranged. The field-of-view image generation module 1438 generates the field-of-view region 17 to be displayed on the monitor 130 based on the determined field of view region 15.

The reference-line-of-sight identification module 1423 identifies the line of sight of the user 5 based on a signal from the eye gaze sensor 140. The face part detection module 1424 detects parts (e.g., mouth, eyes, and eyebrows) of the face of the user 5 from the face image of the user 5 generated by the first camera 150 and the second camera 160. The motion detection module 1425 detects a motion (shape) of each part detected by the face part detection module 1424. Details of control of the face part detection module 1424 and the motion detection module 1425 are described later with reference to FIG. 15 to FIG. 17.

The virtual space definition module 1426 generates virtual space data representing the virtual space 11, to thereby define the virtual space 11 in the HMD system 100.

The virtual object generation module 1427 generates objects to be arranged in the virtual space 11. The objects may include, for example, forests, mountains, other landscapes, and animals to be arranged in accordance with the progression of the story of the game.

The operation object control module 1428 arranges, in the virtual space 11, an operation object for receiving an operation of the user 5 in the virtual space 11. The user operates the operation object to operate an object arranged in the virtual space 11, for example. In at least one aspect, the operation object includes, for example, a hand object corresponding to the hand of the user wearing the HMD 120. In at least one aspect, the operation object corresponds to a hand part of an avatar object described later.

The avatar control module 1429 generates data for arranging an avatar object of the user of another computer 200, which is connected via the network 2, in the virtual space 11. In at least one aspect, the avatar control module 1429 generates data for arranging an avatar object of the user 5 in the virtual space 11. In at least one aspect, the avatar control module 1429 generates an avatar object simulating the user 5 based on an image including the user 5. In at least one aspect, the avatar control module 1429 generates data for arranging an avatar object in the virtual space 2, which is selected by the user 5 from among a plurality of types of avatar objects (e.g., objects simulating animals or objects of deformed humans).

The avatar control module 1429 reflects a motion of the HMD 120, which is detected by the HMD sensor 410, in an avatar object. For example, the avatar control module 1429 detects inclination of the HMD 120, and generates data for arranging the avatar object in an inclined manner. In at least one aspect, the avatar control module 1429 reflects a motion of the controller 300 in an avatar object. In this case, the controller 300 includes, for example, a motion sensor, an acceleration sensor, or a plurality of light emitting elements (e.g., infrared LEDs) for detecting a motion of the controller 300. The avatar control module 1429 reflects motions of face parts detected by the motion detection module 1425 in the face of an avatar object arranged in the virtual space 11. That is, the avatar control module 1429 reflects a motion of the face of the user 5A in the avatar object.

When one object in the virtual space 11 collides with another object in the virtual space 11, the control module 510 detects the collision. In at least one embodiment, the control module 510 detects, for example, a timing at which an object and the other object have touched with each other, and performs predetermined processing in response to the detected timing. In at least one embodiment, the control module 510 detects a timing at which an object and another object, which have been in contact with each other, have moved away from each other, and performs predetermined processing in response to the detected timing. In at least one embodiment, the control module 510 detects a state in which an object and the other object are in contact with each other. Specifically, when an operation object touches with another object, the operation object control module 1428 detects the fact that the operation object has touched the other object, and performs predetermined processing.

The memory module 530 stores data usable by the computer 200 to provide the user 5 with the virtual space 11. In at least one aspect, the memory module 530 stores the space information 1431, the object information 1432, the user information 1433, and the face information 1434.

The space information 1431 stores one or more templates that are defined to provide the virtual space 11.

The object information 1432 stores content to be reproduced in the virtual space 11, objects to be used in the content, and information (e.g., positional information) for arranging objects in the virtual space 11. The content may include, for example, game content and content representing landscapes that resemble those of the real world.

The user information 1433 stores, for example, a program for causing the computer 200 to function as a control device of the system. 100 and an application program that uses each content stored in the object information 1432.

The face information 1434 stores templates, e.g., templates that are stored in advance, for the face part detection module 1424 to detect face parts of the user 5. In at least one aspect, the face information 1434 stores a mouth template 1435, an eye template 1436, and an eyebrow template 1437. In at least one embodiment, each template is an image corresponding to a different part of a face. For example, the mouth template 1435 is an image of a mouth. In at least one embodiment, each template includes a plurality of images. In at least one embodiment, an image of the plurality of images is selected for use with the user 5 in advance.

[Face Tracking]

Figure 15:
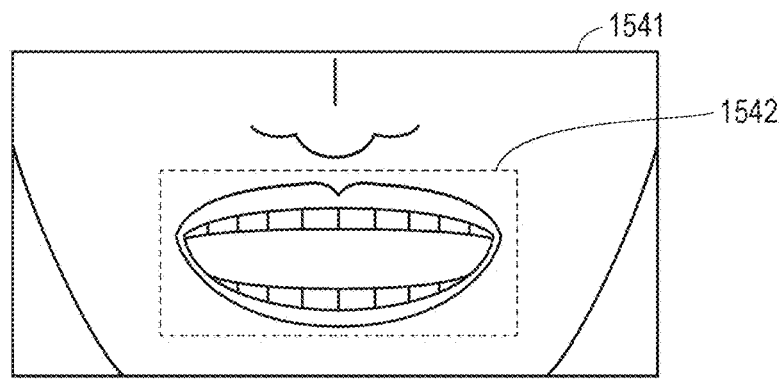
FIG. 15 A diagram of detecting a mouth from a facial image of the user according to at least one embodiment of this disclosure.
Figure 16:
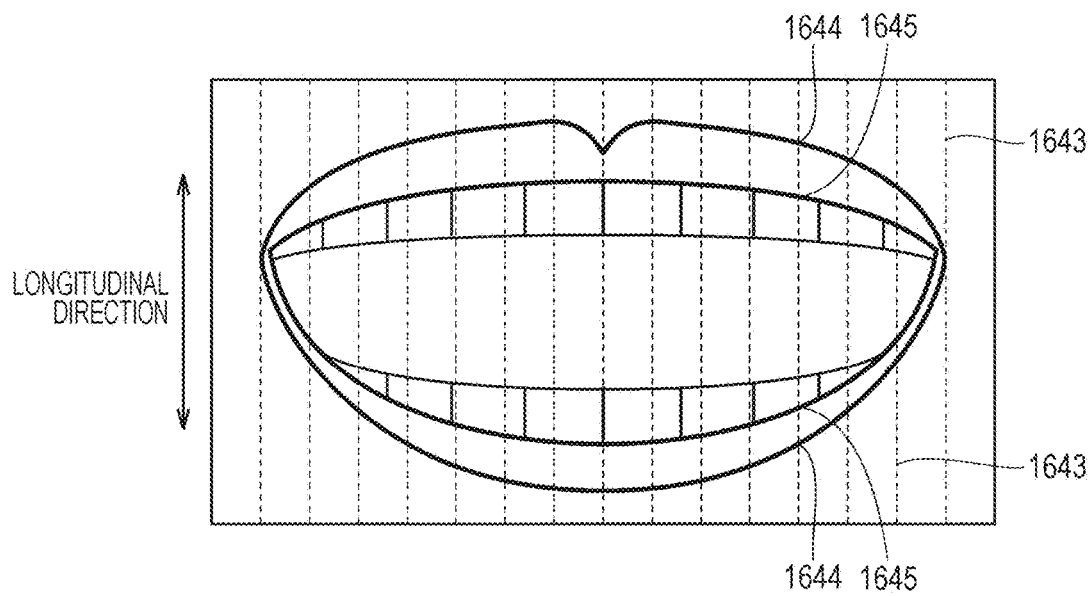
FIG. 16 A diagram of control for detecting a shape of a mouth by a motion detection module according to at least one embodiment of this disclosure.
Figure 17:
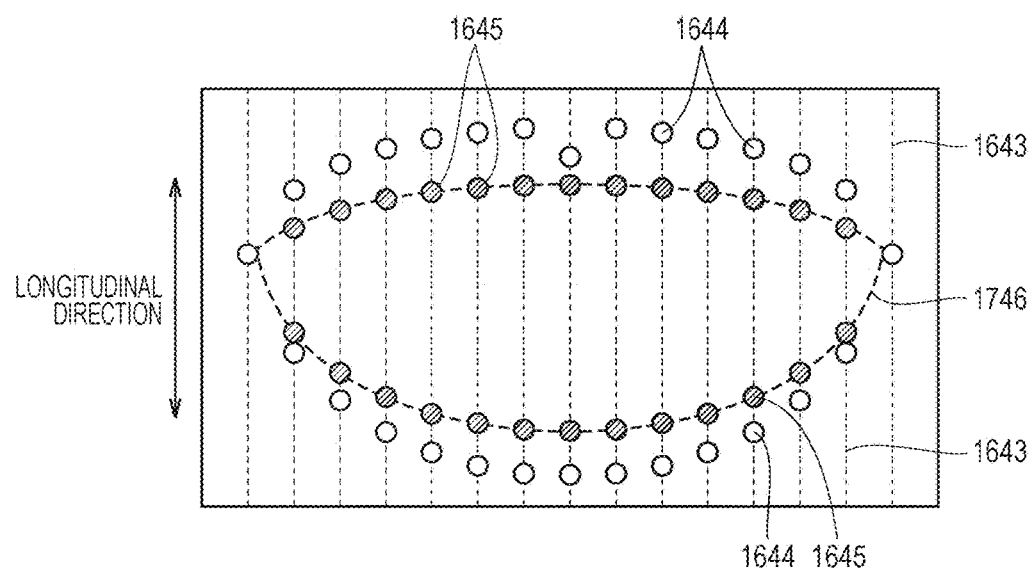
FIG. 17 A diagram of control for detecting the shape of the mouth by the motion detection module according to at least one embodiment of this disclosure.

In the following, with reference to FIG. 15 to FIG. 17, a specific example of detecting a motion (shape) of the face of the user is described. In FIG. 15 to FIG. 17, a specific example of detecting a motion of the mouth of the user is described as an example according to at least one embodiment of this disclosure. The detection method described with reference to FIG. 15 to FIG. 17 is not limited to detection of a motion of the mouth of the user, but may be applied to detection of motions of other parts (e.g., eyes or eyebrows) of the face of the user.

FIG. 15 is a diagram of a mouth from a facial image 1541 of the user according to at least one embodiment of this disclosure. The facial image 1541 generated by the first camera 150 includes the nose and mouth of the user 5.

The face part detection module 1424 identifies a mouth region 1542 from the facial image 1541 by pattern matching using the mouth template 1435 stored in the face information 1434. In at least one aspect, the face part detection module 1424 sets a rectangular comparison region in the facial image 1541, and changes the size, position, and angle of this comparison region to calculate a similarity degree between an image of the comparison region and an image of the mouth template 1435. In at least one embodiment, a shape of the comparison region is a shape other than rectangular, e.g., elliptical. The face part detection module 1424 may identify, as the mouth region 1542, a comparison region for which a similarity degree larger than a threshold value determined in advance is calculated.

In at least one embodiment, the face part detection module 1424 further determines whether or not the comparison region corresponds to the mouth region based on a relative positional relationship between positions of other face parts (e.g., eyes and nose) and the position of the comparison region for which the calculated similarity degree is larger than the threshold value.

The motion detection module 1425 detects a more detailed shape of the mouth from the mouth region 1542 detected by the face part detection module 1424.

FIG. 16 is a diagram of detection of the shape of the mouth by the motion detection module 1425 according to at least one embodiment of this disclosure. With reference to FIG. 16, the motion detection module 1425 sets a contour detection line 1643 for detecting the shape of the mouth (contour of lips) contained in the mouth region 1542. A plurality of contour detection lines 1643 are set at predetermined intervals in a direction (hereinafter referred to as "lateral direction") orthogonal to a height direction (hereinafter referred to as "longitudinal direction") of the face.

In at least one embodiment, the motion detection module 1425 detects a change in brightness value of the mouth region 1542 along each of the plurality of contour detection lines 1643, and identify a position at which the change in brightness value is abrupt as a contour point. More specifically, the motion detection module 1425 identifies, as the contour point, a pixel for which a brightness difference (namely, change in brightness value) between the pixel and an adjacent pixel is equal to or larger than a threshold value determined in advance, in at least one embodiment. The brightness value of a pixel is obtained by, for example, integrating RBG values of the pixel with predetermined weighting.

The motion detection module 1425 identifies two types of contour points from the image corresponding to the mouth region 1542. The motion detection module 1425 identifies a contour point 1644 corresponding to a contour of the outer side of the mouth (lips) and a contour point 1645 corresponding to a contour of the inner side of the mouth (lips). In at least one aspect, when three or more contour points are detected on one contour detection line 1643, the motion detection module 1425 identifies contour points on both ends of the contour detection line 1643 as the outer contour points 1644. In this case, the motion detection module 1425 identifies contour points other than the outer contour points 1644 as the inner contour points 1645. When two or less contour points are detected on one contour detection line 1643, the motion detection module 1425 identifies the detected contour points as the outer contour points 1644.

FIG. 17 is a diagram of detection of the shape of the mouth by the motion detection module 1425 according to at least one embodiment of this disclosure. In FIG. 17, the outer contour points 1644 and the inner contour points 1645 are indicated by white circles and hatched circles, respectively.

The motion detection module 1425 interpolates points between the inner contour points 1645 to identify a mouth shape 1746 (size of mouth opening). In at least one aspect, the motion detection module 1425 identifies the mouth shape 1746 using a nonlinear interpolation method, for example, spline interpolation. In at least one aspect, the motion detection module 1425 identifies the mouth shape 1746 by interpolating points between the outer contour points 1644. In at least one aspect, the motion detection module 1425 identifies the mouth shape 1746 by removing contour points that greatly deviate from an assumed mouth shape (predetermined shape that may be formed by upper lip and lower lip of person) and using left contour points. In this manner, the motion detection module 1425 may identify a motion (shape) of the mouth of the user. The method of detecting the mouth shape 1746 is not limited to the above, and the motion detection module 1425 may detect the mouth shape 1746 with another technique. The motion detection module 1425 may detect motions of other face parts of eyes and eyebrows of the user in the same manner.

FIGS. 18A and 18B are diagrams of a comparison between a facial expression of the user in the real space and a facial expression of the avatar object of the user in the virtual space according to at least one embodiment of this disclosure. FIG. 18A is a diagram of the user 5B in the real space according to at least one embodiment of this disclosure. FIG. 18B is a diagram of a field-of-view image 1817A recognized by the user 5A according to at least one embodiment of this disclosure.

With reference to FIG. 18A, the first camera 150B and the second camera 160B constructing the HMD set 110B photograph the user 5B. The user 5B is smiling at the time of photography. In FIG. 18A, the user is wearing the HMD 120B, but the HMD 120B is omitted for the sake of clarity. The HMD is also omitted for similar diagrams described later.

The motion detection module 1425 detects the shape of the mouth of the user 5B based on an image photographed by the first camera 150B. The computer 200B outputs data representing the detected shape (motion) of the mouth to the server 600. The server 600 transfers the data to the computer 200A, which shares the same virtual space 11 as that of the computer 200B. An avatar control module 1429A reflects the shape of the mouth of the user 5B in the avatar object 6B based on the data. With this, as in FIG. 18B, the avatar object 6B displayed on the field-of-view image 1817A of the user 5A represents a facial expression of smiling.

[Control Structure of Server 600]

Figure 19:
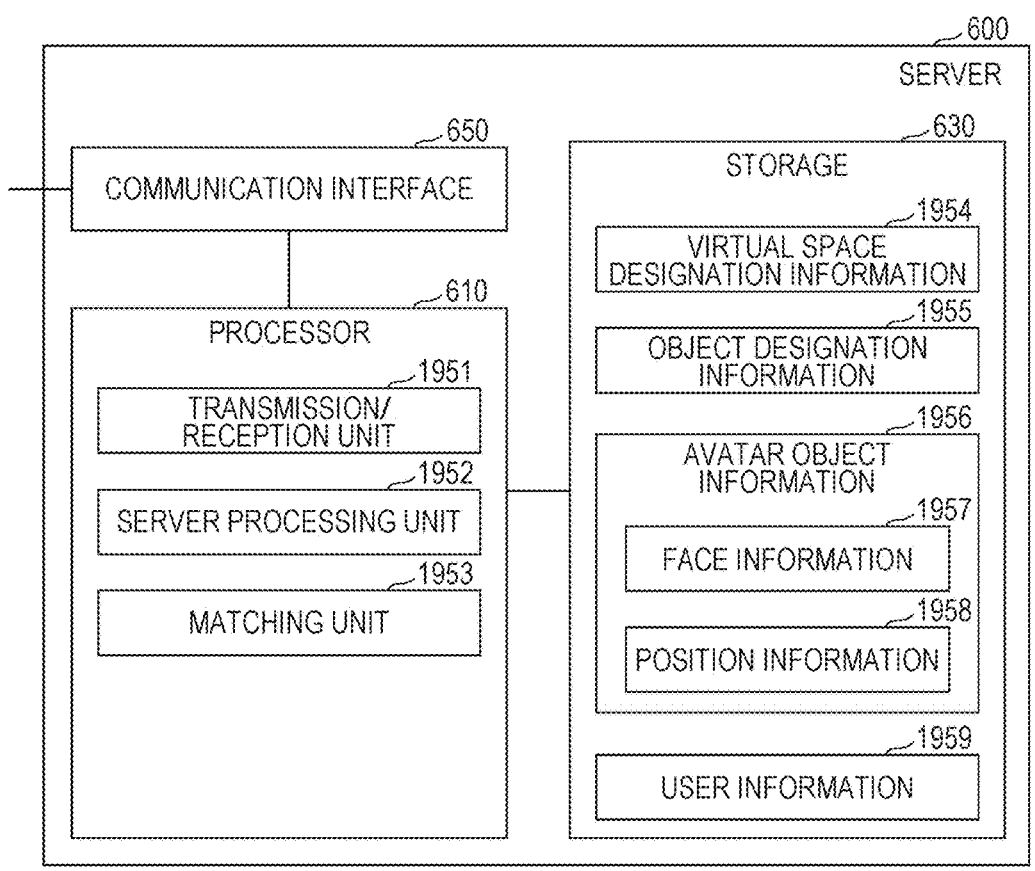
FIG. 19 A diagram of a hardware configuration and a module configuration of the server according to at least one embodiment of this disclosure.

FIG. 19 is a diagram of a hardware configuration and a module configuration of the server 600 according to at least one embodiment of this disclosure. In one embodiment of this disclosure, the server 600 includes the communication interface 650, the processor 610, and the storage 630.

The communication interface 650 functions as a communication module for wireless communication, which is configured to perform, for example, modulation/demodulation processing for transmitting/receiving signals to/from an external communication device, for example, the computer 200. The communication interface 650 is implemented by, for example, a tuner or a high frequency circuit.

The processor 610 controls operation of the server 600. The processor 610 executes various control programs stored in the storage 630 to function as a transmission/reception unit 1951, a server processing unit 1952, and a matching unit 1953.

The transmission/reception unit 1951 transmits/receives various kinds of information to/from each computer 200. For example, the transmission/reception unit 1951 transmits to each computer 200 a request for arranging objects in the virtual space 11, a request for deleting objects from the virtual space 11, a request for moving objects, voices of the user, or information for defining the virtual space 11.

The server processing unit 1952 performs processing required for a plurality of users to share the same virtual space 11. For example, the server processing unit 1952 updates avatar object information 1956 described later based on the information received from the computer 200.

The matching unit 1953 performs a series of processing for associating a plurality of users with one another. For example, when an input operation for the plurality of users to share the same virtual space 11 is performed, the matching unit 1953 performs, for example, processing of associating users belonging to the virtual space 11 to one another.

The storage 630 stores virtual space designation information 1954, object designation information 1955, the avatar object information 1956, and user information 1959.

The virtual space designation information 1954 is information to be used by the virtual space definition module 1426 of the computer 200 to define the virtual space 11. For example, the virtual space designation information 1954 contains information for designating the size of the virtual space 11.

The object designation information 1955 designates an object to be arranged (generated) by the virtual object generation module 1427 of the computer 200 in the virtual space 11.

The avatar object information 1956 contains face information 1957 and position information 1958. The face information 1957 is information (face tracking data) representing a motion (shape) of each part (e.g., mouth, eyes, and eyebrows) forming the face of the user of the computer 200. The face tracking data is an example of face data. The position information 1958 represents a position (coordinates) of each avatar object in the virtual space 11. The avatar object information 1956 is updated as appropriate based on information input from the computer 200.

The user information 1959 is information on the user 5 of the computer 200. The user information 1959 contains, for example, identification information (e.g., user account) identifying the plurality of users 5.

[Control for Reflecting Operation of User in Avatar Object]

Figure 20:
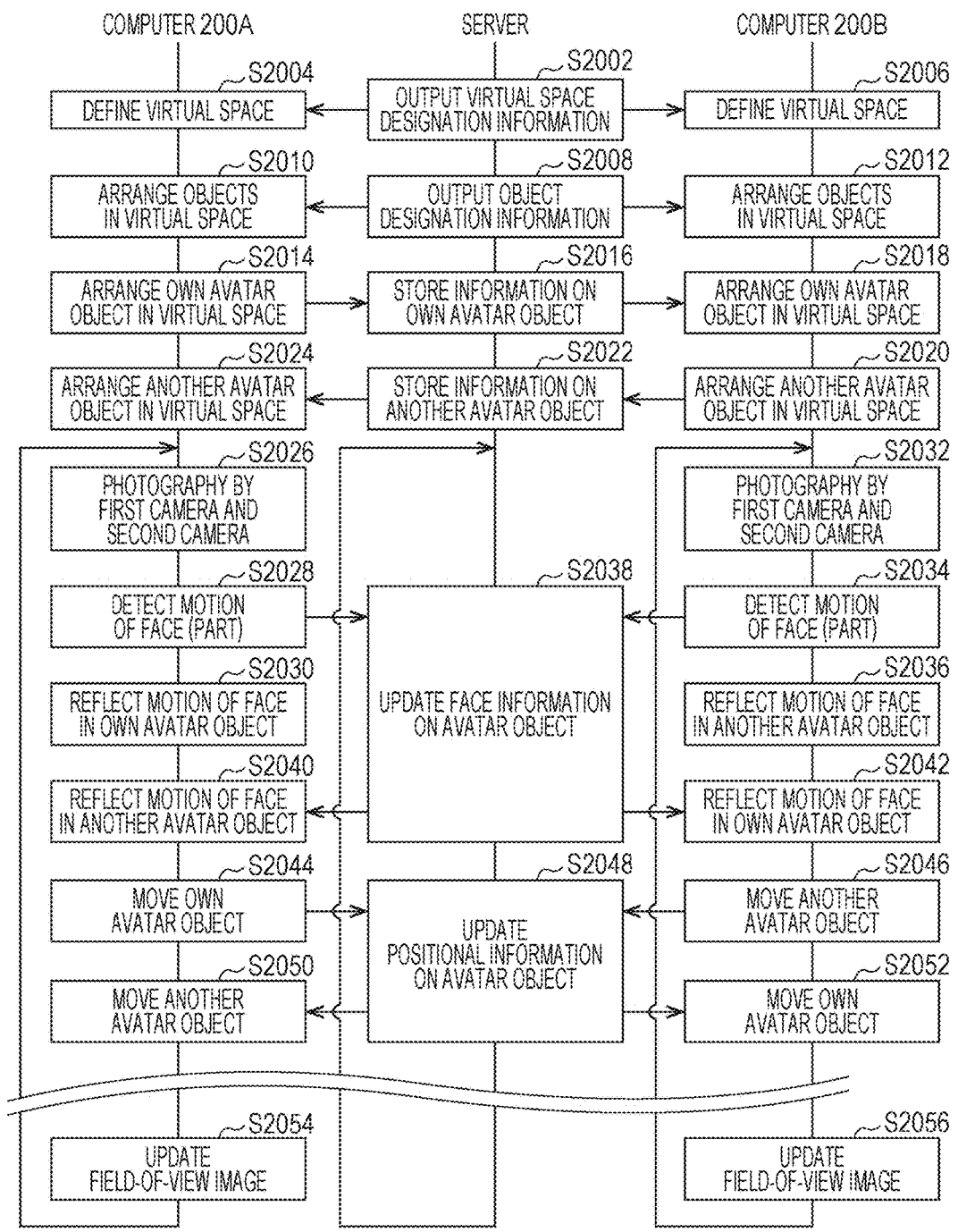
FIG. 20 A sequence diagram of signals between the computer and the server for reflecting a motion of the user in the avatar object according to at least one embodiment of this disclosure.

With reference to FIG. 20, a method of controlling operation of an avatar object in the virtual space is described. FIG. 20 is a flowchart of signals between the computer 200 and the server 600 for translating a motion of the user in the avatar object according to at least one embodiment of this disclosure. In at least one embodiment, the processing in FIG. 20 is implemented by the processor 210 of the computer 200 executing a control program stored in the memory 220 or the storage 230 and the processor 610 of the server 600 executing a control program stored in the storage 630.

In Step S2002, the processor 610 of the server 600 serves as the transmission/reception unit 1951 to transmit the virtual space designation information 1954 to the computers 200A and 200B based on requests for generating the virtual space, which are received from the computers 200A and 200B. At this time, in at least one embodiment, each computer 200 transmits identification information on the user 5 to the server 600 together with the virtual space designation information 1954. Then, in at least one embodiment, the processor 610 serves as the matching unit 1953 to associate pieces of identification information on the computers 200A and 200B with each other to establish the fact that the users 5A and 5B share the same virtual space.

In Step S2004, the processor 210A of the computer 200A serves as a virtual space definition module 1426A to define the virtual space 11A based on the received virtual space designation information 1954. In Step S2006, similarly to the processor 210A, the processor 210B of the computer 200B defines the virtual space 11B.

In Step S2008, the processor 610 outputs the object designation information 1955 for designating objects to be arranged in the virtual spaces 11A and 11B to the computers 200A and 200B.

In Step S2010, the processor 210A serves as a virtual object generation module 1427A to arrange objects in the virtual space 11A based on the received object designation information 1955. In Step S2012, the processor 210B arranges objects in the virtual space 11B similarly to the processor 210A.

In Step S2014, the processor 210A serves as an avatar control module 1429A to arrange the avatar object 6A (denoted by "own avatar object" in FIG. 20) of the user 5A himself or herself in the virtual space 11A. Then, the processor 210A transmits information (e.g., data for modeling and positional information) on the avatar object 6A to the server 600.

In Step S2016, the processor 610 stores the received information on the avatar object 6A into the storage 630 (avatar object information 1956). The processor 610 further transmits the information on the avatar object 6A to the computer 200B sharing the same virtual space with the computer 200A.

In Step S2018, the processor 210B serves as an avatar control module 1429B to arrange the avatar object 6A in the virtual space 11B based on the received information on the avatar object 6A.

Similarly to Step S2014 to Step S2018, in Step S2020 to Step S2024, the avatar object 6B is generated in the virtual spaces 11A and 11B (denoted by "another avatar object" in FIG. 20), and information on the avatar object 6B is stored in the storage 630.

In Step S2026, the processor 210A photographs the face of the user 5A with the first camera 150A and the second camera 160A to generate a facial image.

In Step S2028, the processor 210A serves as the face part detection module 1424A and the motion detection module 1425A to detect face tracking data representing a motion (shape) of the face (e.g., mouth, eyes, and eyebrows) of the user 5A. The processor 210A further transmits the detected face tracking data to the server 600.

In Step S2030, the processor 210A serves as the avatar control module 1429A to reflect the detected motion of the face of the user 5A in the avatar object 6A arranged in the virtual space 11A.

In Step S2032 to Step S2036, similarly to Step S2026 to Step S2030, the processor 210B reflects a motion of the face of the user 5B in the avatar object 6B based on the facial images generated by the first camera 150B and the second camera 160B. The processor 210B transmits face tracking data representing the motion of the face of the user 5B to the server 600.

In Step S2038, the processor 610 serves as the server processing unit 1952 to update the face information 1957 corresponding to the avatar object 6A based on the face tracking data received from the computer 200A. The processor 610 further updates the face information 1957 corresponding to the avatar object 6B based on the face tracking data received from the computer 200B.

In Step S2038, the processor 610 further serves as the transmission/reception unit 1951 to transmit the face tracking data received from the computer 200A to the computer 200B. The processor 610 transmits the face tracking data received from the computer 200B to the computer 200A.

In Step S2040, the processor 210A serves as the avatar control module 1429A to reflect a motion of the face of the user 5B in the avatar object 6B based on the face tracking data received from the server 600.

In Step S2042, the processor 210B serves as the avatar control module 1429B to translate a motion of the face of the user 5A in the avatar object 6A based on the face tracking data received from the server 600.

In Step S2044, the processor 210A moves the avatar object 6A. "Movement" in this step includes changing the coordinate position of an avatar object and changing the direction (inclination) of the avatar object. As an example, the processor 210A receives, from the controller 300, input of an instruction to move the own avatar object 6A. As an example, the processor 210A moves the avatar object 6A based on the positional information on the HMD 120 detected by the HMD sensor 410. In Step S2044, the processor 210A further transmits the positional information on the avatar object 6A in the virtual space 11A to the server 600. In at least one aspect, the processor 210A is configured to transmit information representing the movement amount of the avatar object 6A to the server 600.

In Step S2046, similarly to the processor 210A, the processor 210B moves the avatar object 6B, and at the same time, transmits the positional information on the avatar object 6B in the virtual space 11B to the server 600.

In Step S2048, the processor 610 serves as the server processing unit 1952 to update the position information 1958 corresponding to the avatar object 6A based on the positional information received from the computer 200A. The processor 610 further updates the position information 1958 corresponding to the avatar object 6B based on the positional information received from the computer 200B.

In Step S2048, the processor 610 further serves as the transmission/reception unit 1951 to transmit the positional information received from the computer 200A to the computer 200B. The processor 610 transmits the positional information received from the computer 200B to the computer 200A.

In Step S2050, the processor 210A serves as the avatar control module 1429A to move the avatar object 6B based on the received positional information. In Step S2052, the processor 210B serves as the avatar control module 1429B to move the avatar object 6A based on the received positional information.

In Step S2054, the processor 210A displays, on the monitor 130A, an image photographed by the virtual camera 12A arranged at the position of the eyes of the avatar object 6A. As a result, a field-of-view image recognized by the user 5A is updated. After that, the processor 210A returns the processing to Step S2026.

In Step S2056, similarly to the processor 210A, the processor 210B displays an image photographed by the virtual camera 12B on the monitor 130B. With this, a field-of-view image recognized by the user 5B is updated. After that, the processor 210B returns the processing to Step S2032.

In at least one embodiment of this disclosure, the processing of Step S2026 to S2056 is executed repeatedly at an interval of, e.g., 1/60 second or 1/30 second.

Through a series of processing described above, the user 5 is able to understand the facial expression of a partner via an avatar object of the partner.

In at least one aspect, the above-mentioned repeatedly executed processing includes processing of transmitting voices of the user 5 to the computer 200 of the partner and other processing of enhancing communication between users in the virtual space 11.

As described above, in Step S2014 and in Step S2020, the computer 200 arranges the avatar object 6 of the user in the virtual space 11. In at least one aspect, the processing in Step S2014 and in Step S2020 is omitted because the user is able to communicate to/from a partner as long as the avatar object of the partner is arranged in the virtual space 11.

[Increase (Change) of Face Tracking Data]

Figure 21A:
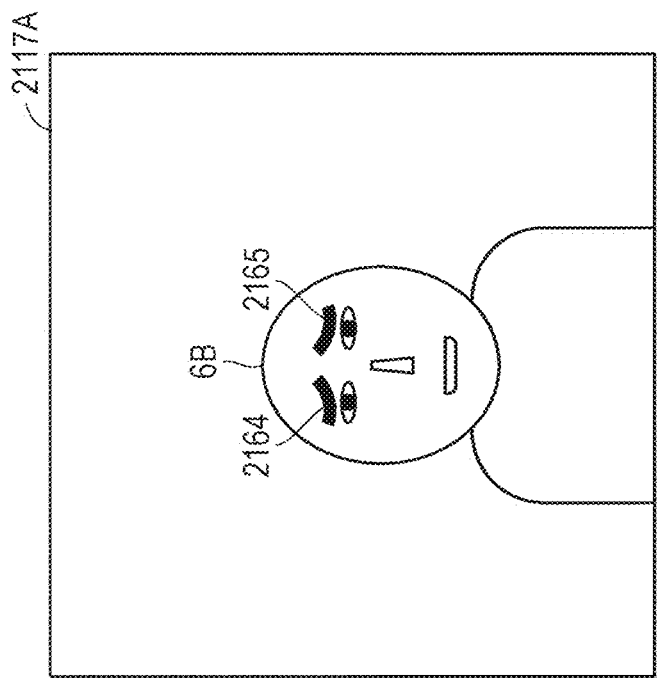
FIG. 21A A diagram of a facial expression of a user having increased motions of eyebrows in a real space according to at least one embodiment of this disclosure.
Figure 21B:
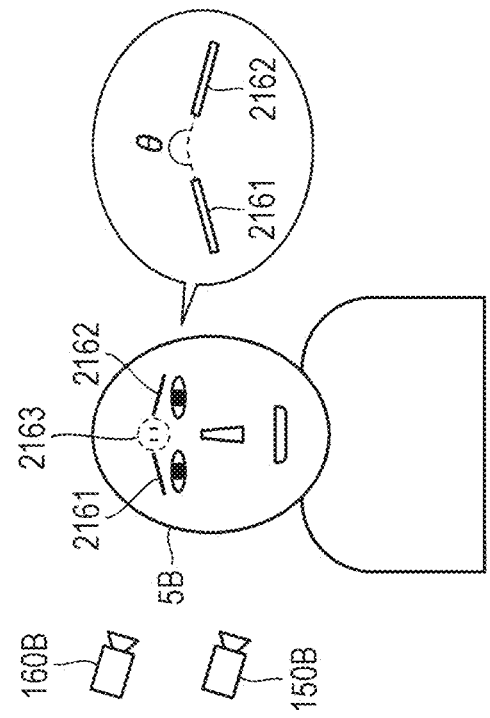
FIG. 21B A diagram of a facial expression of an avatar object of the user in the virtual space reflecting the increased motions in the avatar object according to at least one embodiment of this disclosure.

With reference to FIG. 21A and FIG. 21B, a technology of encouraging communication between users in the virtual space 11 is described. FIG. 21A and FIG. 21B are diagrams of detected motion of eyebrows of the user in the real space, and corresponding motions of eyebrows in the avatar object in the virtual space 11. FIG. 21A is a diagram of the user 5B in the real space according to at least one embodiment of this disclosure. FIG. 21B is a diagram of the avatar object 6B in the field-of-view image 2117A of the user 5A according to at least one embodiment of this disclosure.

In at least one aspect, the user 5B uses the first camera 150B and the second camera 160B to photograph a facial image. At this time, the user 5B is troubled, and an angle θ formed by a right eyebrow 2161 and a left eyebrow 2162 is 180 degrees or more.

For example, when the angle θ is 200 degrees or more, the user 5A recognizing the avatar object 6B of the user 5B easily notices that the user 5B is troubled. However, when the angle θ is 200 degrees or less, the user 5A is less likely to notice that the user 5B is troubled.

In view of this, in at least one aspect, when the angle θ formed by the eyebrows of the user 5B is equal to or larger than 180 degrees and smaller than 200 degrees, the processor 210B of the computer 200B transmits face tracking data in which motions of the eyebrows are increased to cause the angle θ to be 200 degrees or more. That is, a magnitude of change of the corresponding portion of the face of the avatar object 6B is different from a magnitude of the detected change of the portion of the face of the user 5B. With this, as in FIG. 21B, the angle formed by eyebrows 2164 and 2165 of the avatar object 6B recognized by the user 5A is 200 degrees or more, and thus the user 5A easily notices that the user 5B is troubled.

In the above-mentioned example, the processor 210 detects the angle θ formed by eyebrows of the user 5. However, the processing of determining whether or not the user 5 is troubled is not limited thereto. In at least one aspect, the processor 210 stores a normal angle of eyebrows of the user 5B in advance, and when an angle of deviation with respect to the normal angle falls within a range (e.g., 5 degrees or more and 10 degrees or less) defined in advance, face tracking data is generated in which motions of the eyebrows of the corresponding avatar object are increased. In at least one embodiment, the normal angle of eyebrows is, for example, an angle (e.g., angle of eyebrows with respect to eyes) of eyebrows of the user 5B that has been measured most frequently in a certain period of time (e.g., 5 seconds). In at least one embodiment, the normal angle of eyebrows is, for example, an angle of eyebrows of the user 5B obtained from a template image of the user 5B.

In at least one aspect, the processor 210 determines whether or not the user 5 is troubled based on a wrinkle 2163 formed between the right eyebrow 2161 and the left eyebrow 2162 of the user 5. For example, when the number of wrinkles 2163 falls within a predetermined range, the processor 210 determines that the user 5 is troubled, and generates face tracking data in which motions of the eyebrows are increased.

Figure 22A:
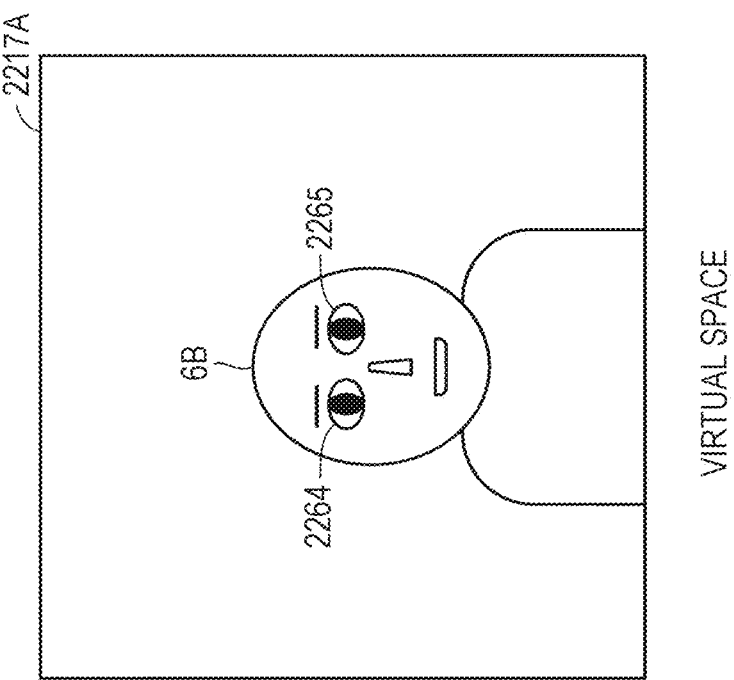
FIG. 22A A diagram of a facial expression of a user having increased motions of eyes in a real space according to at least one embodiment of this disclosure.
Figure 22B:
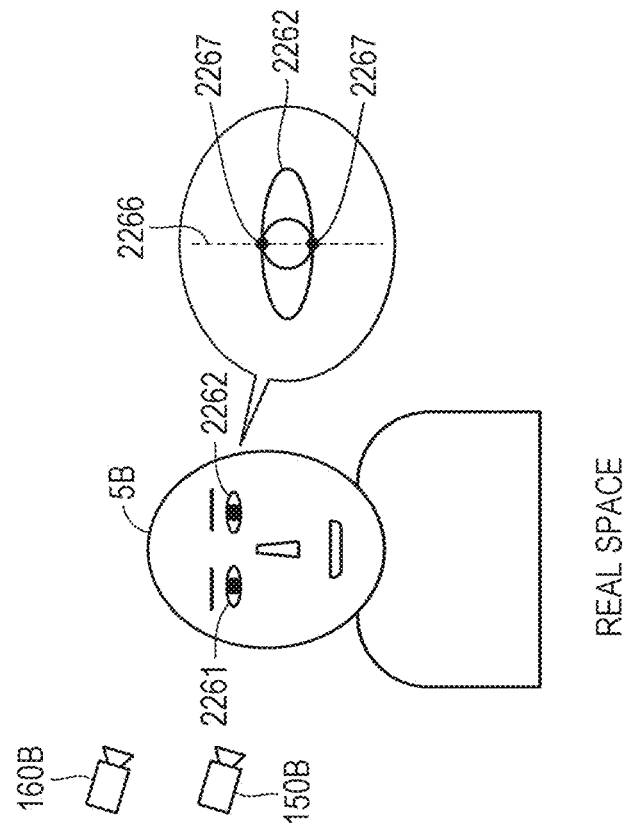
FIG. 22B A diagram of a facial expression of an avatar object of the user in the virtual space reflecting the increased motions in the avatar object according to at least one embodiment of this disclosure.

FIG. 22A and FIG. 22B are diagrams of increasing (emphasizing) motions (shapes) of the eyes of the user in the real space, and translating the increased (emphasized) motions in the avatar object in the virtual space 11.

FIG. 22A is a diagram of the user 5B in the real space according to at least one embodiment of this disclosure. FIG. 22B is a diagram of the avatar object 6B in a field-of-view image 2217A recognized by the user 5A according to at least one embodiment of this disclosure.

In FIG. 22A, the user 5B is surprised, and a right eye 2261 and a left eye 2262 have opened a little wider. However, in some instances, the user 5A will not notice that the user 5B is surprised with the eyes of the avatar object 6B having opened only a little wider.

In view of the above, in at least one aspect, the processor 210B transmits, to the server 600, face tracking data in which motions (shapes) of the eyes of the user 5B are increased. In at least one aspect, as described above with reference to FIG. 16 and FIG. 17, the processor 210B detects, as the size of an eye, an interval between outer contour points 2267 on a certain contour detection line 2266. When the size of an eye falls within a predetermined range, the processor 210B increases the motion (shape) of the eye, namely, generates face tracking data in such a manner as to increase the size of the eye, and outputs the face tracking data to the server 600. That is, a magnitude of change of the corresponding portion of the face of the avatar object 6B is different from a magnitude of the detected change of the portion of the face of the user 5B. With this, as in FIG. 22B, eyes 2264 and 2265 of the avatar object 6B recognized by the user 5A have opened noticeably wider, and thus the user 5A is able to easily notice that the user 5B is surprised.

In at least one aspect, the processor 210B is configured to, when the variation amount with respect to the normal size of an eye falls within a predetermined range, generate face tracking data in which a motion of the eye is increased. In at least one embodiment, the normal size of an eye of the user 5B is the size of the eye that has been measured most frequently in a certain period of time (e.g., 5 seconds). In at least one embodiment, the normal size of an eye is, for example, a size of the eye of the user 5B obtained from a template image of the user 5B.

In the examples of FIG. 21A, FIG. 21B, FIG. 22A and FIG. 22B, the computer 200B generates face tracking data in which motions of part of the face are increased, but in at least one aspect, the computer 200A or the server 600 performs this processing.

Figure 23:
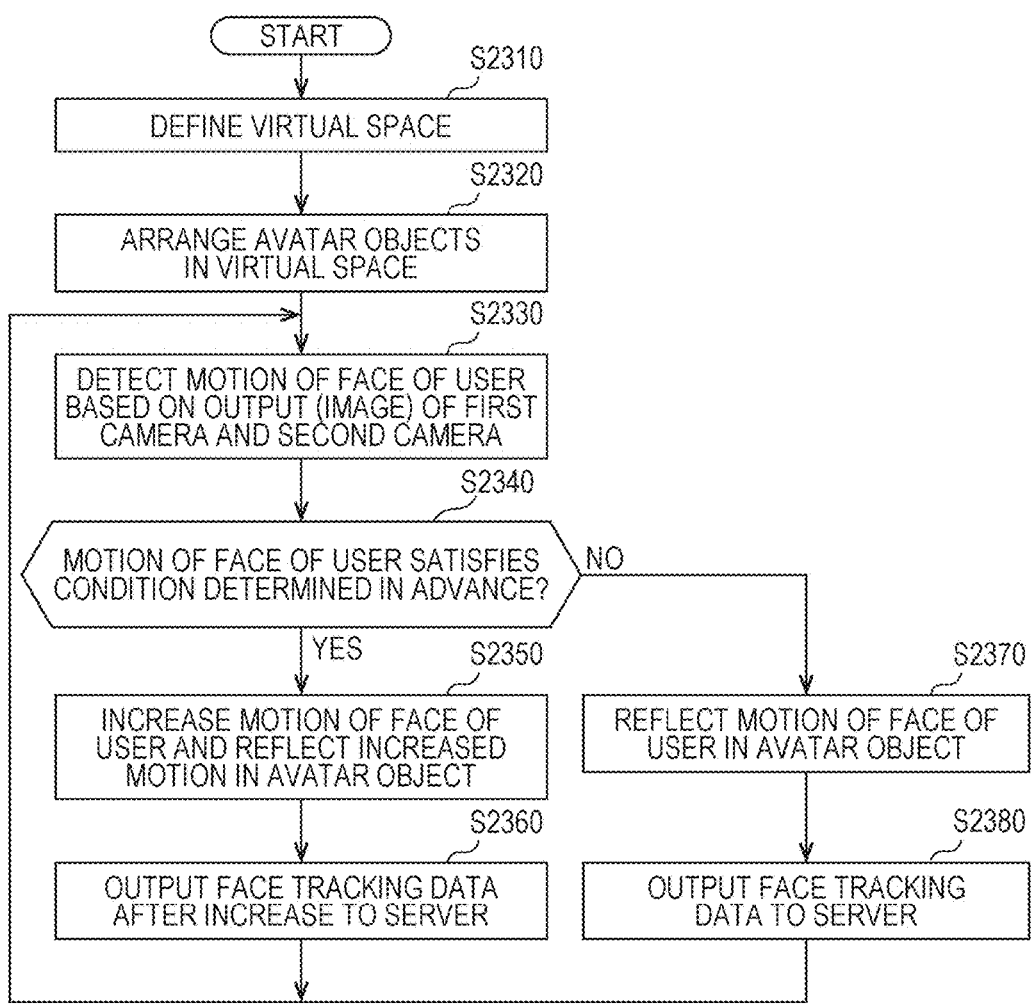
FIG. 23 A flowchart of processing performed by the computer for increased motions of the avatar object according to at least one embodiment of this disclosure.

FIG. 23 is a flowchart of processing of the computer 200 performed in FIG. 21A, FIG. 21B, FIG. 22A and FIG. 22B according to at least one embodiment of this disclosure. In at least one embodiment, the processing in FIG. 23 is implemented by the processor 210 of the computer 200 executing a control program stored in the memory 220 or the storage 230.

In Step S2310, the processor 210 defines the virtual space 11 based on the virtual space designation information 1954 received from the server 600.

In Step S2320, the processor 210 arranges the avatar object 6 in the virtual space 11.

In Step S2330, the processor 210 detects a motion of the face of the user 5 based on the facial image of the user 5 photographed by the first camera 150 and the second camera 160.

In Step S2340, the processor 210 determines whether or not the detected motion of the face of the user 5 satisfies a condition determined in advance. More specifically, the processor 210 determines whether or not a motion of each part of the face satisfies a condition set for each part. For example, the processor 210 determines whether or not the size of an eye falls within a range determined in advance.

When the processor 210 determines that the detected motion of the face of the user 5 satisfies the condition determined in advance (YES in Step S2340), the processor 210 advances the processing to Step S2350. Otherwise (NO in Step S2340), the processor 210 advances the processing to Step S2370.

In Step S2350, the processor 210 increases the detected motion of the face, and translates the increased motion in the avatar object 6 arranged in the virtual space 11.

In Step S2360, the processor 210 outputs to the server 600 face tracking data in which the motion is increased. After that, the processor 210 returns the processing to Step S2330.

In Step S2370, the processor 210 translates the detected motion of the face in the avatar object 6. At this time, the processor 210 does not increase the detected motion of the face.

In Step S2380, the processor 210 outputs to the server 600 face tracking data in which the motion is not increased. After that, the processor 210 returns the processing to Step S2330.

According to the above-mentioned description, the system 100 in at least one embodiment of this disclosure diversifies the facial expression of an avatar object in the virtual space 11, to thereby encourage communication between users belonging to the virtual space 11.

FIG. 24A and FIG. 24B are diagrams of increasing (emphasizing) a motion (shape) of the mouth of the user in the real space, and translating the increased (emphasized) motion in the avatar object in the virtual space 11.

FIG. 24A is a diagram of the user 5B in the real space according to at least one embodiment of this disclosure. FIG. 24B is a diagram of the avatar object 6B in a field-of-view image 2417A recognized by the user 5A according to at least one embodiment of this disclosure. With reference to FIG. 24A, the user 5B utters a voice toward a microphone 170B, e.g., when having a conversation with the user 5A in the virtual space 11B. At the same time, the first camera 150B photographs a motion (shape) of the mouth of the user 5B.

In at least one aspect, the motion of the mouth of the user 5B detected by the processor 210 is small although the volume of utterance by the user 5B, which is detected by the microphone 170B, is sufficiently large to indicate the user 5B is talking.

In this case, the user 5A hears a loud voice from the speaker 180A although the mouth of the avatar object 6B has moved a little, and thus may feel a sense of strangeness. As a result, the user 5A may not be able to concentrate on communication to/from the user 5B, in some instances.

In view of the above, in at least one aspect, when the volume of a sound detected by the microphone 170 is equal to or larger than a threshold value (volume) and the detected motion of the mouth of the user 5B is small, the processor 210B generates face tracking data in which the detected motion of the mouth is increased for output to the server 600. As a result, as in FIG. 24B, the mouth 2472 of the avatar object 6B has opened wider than a detected movement of the mouth of the user 5B. That is, a magnitude of change of the corresponding portion of the face of the avatar object 6B is different from a magnitude of the detected change of the portion of the face of the user 5B. Thus, the user 5A becomes less likely to feel a sense of strangeness. In at least one aspect, the threshold value (sound volume) is determined in advance and set to about a sound volume (e.g., 60 decibels) of utterance by a person at the time of conversation.

In the above description, although the case of a large sound volume and a small motion has been described, the sound may be small and the motion may be large. That is, the user may feel a sense of strangeness also when the sound is small and the motion of the mouth is large (e.g., when microphone 170 is far from user 5). Thus, when the volume of sound detected by the microphone 170 is smaller than a threshold value and the detected motion of the mouth of the user 5B is large, the processor 210B generates face tracking data in which the detected motion of the mouth is decreased for output to the server 600. As a result, the user becomes less likely to feel a sense of strangeness about a relationship between the volume and the size of the mouth.

In the above description, as an example, as in FIG. 17, the processor 210B detects an interval between the inner contour points 1645 on one contour detection line 1643 as a motion of the mouth (size of mouth).

Figure 25:
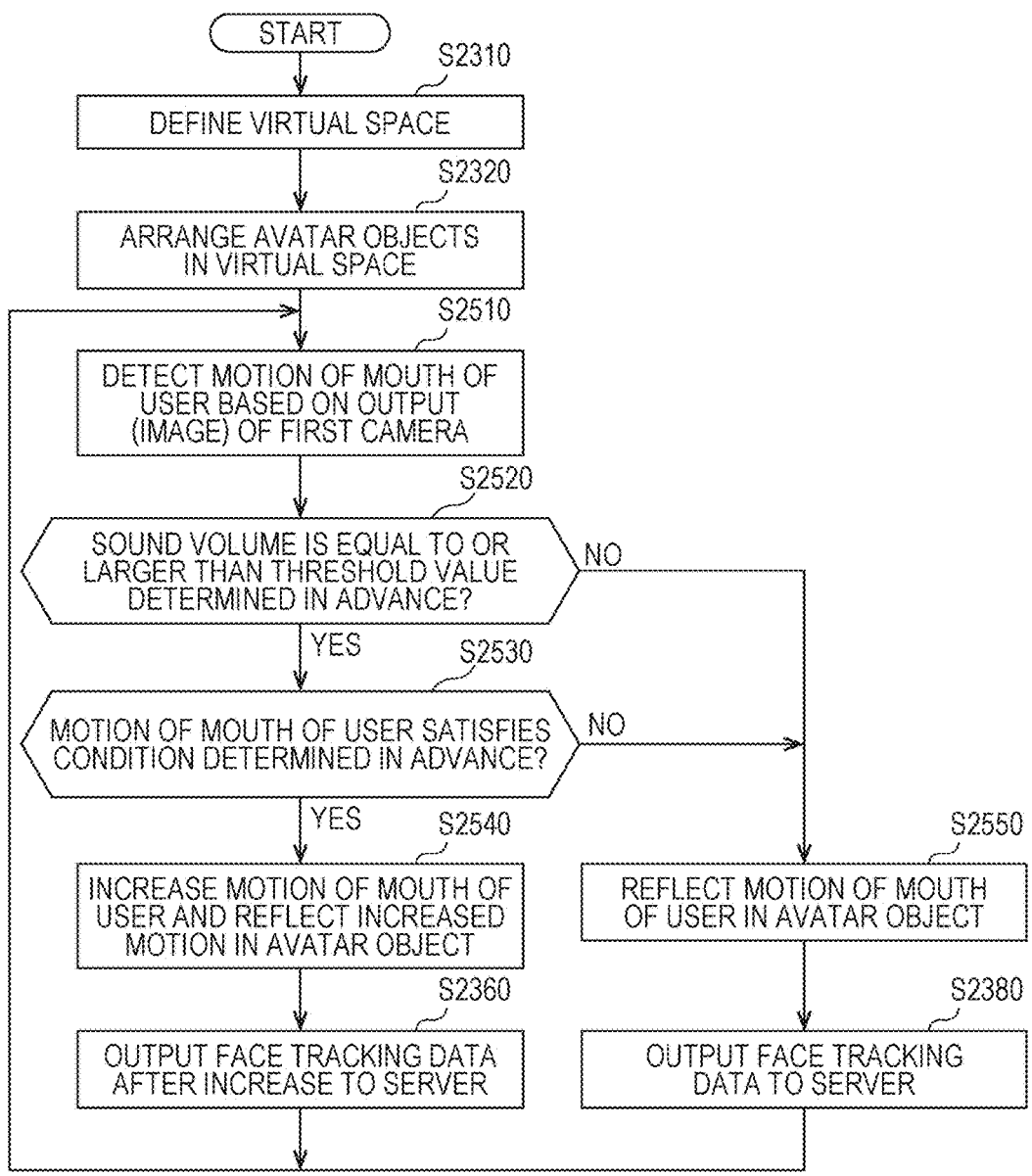
FIG. 25 A flowchart of processing performed by the computer for increased motions of the avatar object according to at least one embodiment of this disclosure.

FIG. 25 is a flowchart of processing of the computer 200 performed in FIG. 24A and FIG. 24B according to at least one embodiment of this disclosure. In at least one embodiment, the processing in FIG. 25 is implemented by the processor 210 of the computer 200 executing a control program stored in the memory 220 or the storage 230. Processing steps in FIG. 25 that are denoted by the same reference symbols as those of FIG. 23 are the similar processing steps as those of FIG. 23. Thus, a description of the processing steps is not repeated for the sake of brevity.

In Step S2510, the processor 210 detects a motion (shape and size) of the mouth of the user 5 based on the mouth image of the user 5 photographed by the first camera 150.

In Step S2520, the processor 210 determines whether or not the volume of voice of the user 5 detected by the microphone 170 is equal to or larger than a threshold value determined in advance. When the processor 210 determines that the volume of the voice of the user 5 is equal to or larger than the threshold value determined in advance (YES in Step S2520), the processor 210 advances the processing to Step S2530. Otherwise (NO in Step S2520), the processor 210 advances the processing to Step S2550.

In Step S2530, the processor 210 determines whether or not the detected motion of the mouth of the user 5 satisfies a condition determined in advance. As at least one example, when the detected size of the mouth of the user 5 is smaller than a threshold value, the processor 210 determines that the condition determined in advance is satisfied.

When the processor 210 determines that the detected motion of the mouth of the user 5 satisfies the condition determined in advance (YES in Step S2530), the processor 210 advances the processing to Step S2540. Otherwise (NO in Step S2530), the processor 210 advances the processing to Step S2550.

In Step S2540, the processor 210 increases the detected motion (size) of the mouth of the user 5, and translates the increased motion in the avatar object 6.

In Step S2550, the processor 210 reflects the detected motion of the mouth of the user 5 in the avatar object 6 without increasing the motion.

According to the above description, the user 5 becomes less likely to feel a sense of strangeness about the relationship between the volume of the voice and the size of the mouth of an avatar object. As a result, the system 100 helps to encourage communication between the users 5 in the virtual space 11.

[Adjustment of Degree of Increase Depending on Types of Avatar Objects]

Figure 26B:
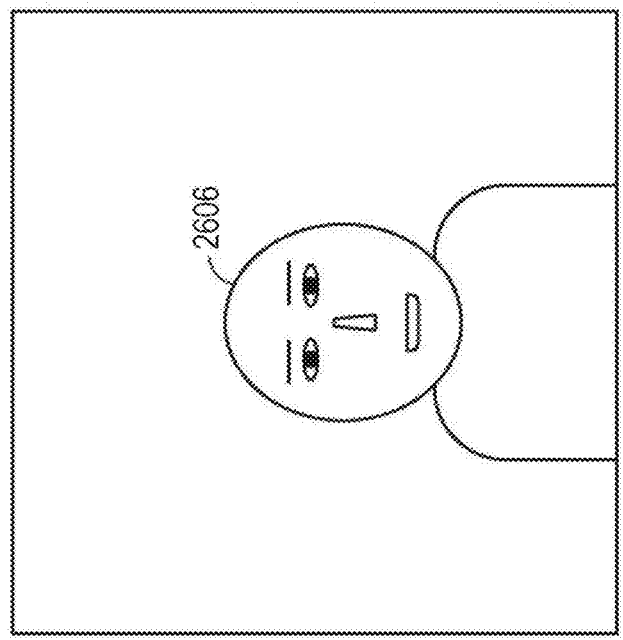
FIG. 26B A diagram of a deformed avatar object in the virtual space according to at least one embodiment of this disclosure.
Figure 26A:
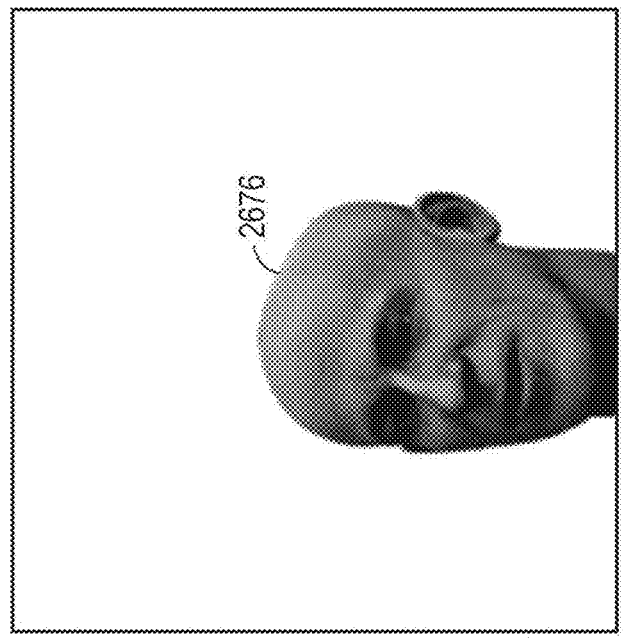
FIG. 26A A diagram of a realistic avatar object in the virtual space according to at least one embodiment of this disclosure.

FIG. 26A and FIG. 26B are diagrams of a type of the avatar object and a degree of increase in detected motion of the user. FIG. 26A is a diagram of a realistic avatar object 2676 according to at least one embodiment of this disclosure. FIG. 26B is a diagram of a deformed (simplified) avatar object 2606 according to at least one embodiment of this disclosure.

In at least one aspect, the realistic avatar object 2676 is arranged in the space 11. At this time, when each part forming the face of the avatar object 2676, which accurately reproduces a person in the real world, moves in an unrealistic manner, the user 5 recognizing the avatar object 2676 may feel a sense of strangeness, in some instances. Thus, in at least one aspect, the processor 210 sets an increase rate of a motion of the face of the user 5 for the realistic avatar object 2676 lower than an increase rate of a motion of the face of the user 5 for the deformed avatar object 2606. As a result, the user 5 recognizing the realistic avatar object 2676 becomes less likely to feel a sense of strangeness. In this manner, in at least one embodiment, the system 100 is configured to adjust the increase rate of the detected motion of the face of the user 5 depending on the type of the avatar objects 6 in the virtual space 11. In at least one embodiment, the avatar object 6 includes, for example, an object simulating an animal, a deformed (simplified) object of a person, or a realistic object of a person.

[Other Configurations]

In the example given above, the system 100 is configured to use the first camera 150 and the second camera 160 to acquire an image of the face of the user 5, and detect a motion of the face of the user 5 through processing of the image. In at least one aspect, the system 100 is configured to detect a motion of the face of the user 5 based on output of an electromyograph that reads motions of muscles of the face of the user 5. In this case, in at least one embodiment, the system 100 omits at least one of the first camera 150 or the second camera 160, and thus may be simplified. In at least one embodiment, the HMD system 100 eliminates inconvenience of the user 5 caused by the second camera 160 protruding from the HMD 120.

[Configurations]

The technical features of at least one embodiment disclosed above are summarized in the following manner.

(Configuration 1)

There is provided a method to be executed by a processor 210 of a computer 200 for communication via a virtual space. The method includes defining (S2310) a virtual space; arranging (S2320), in the virtual space, an avatar object 6 of a user 5 performing communication via the virtual space. The method further includes detecting (S2330) a motion of a face of the user. The method further includes increasing the detected motion of the face and translating the increased motion in the face of the avatar object 6.

(Configuration 2)

A method according to Configuration 1, in which the step of translating the increased motion includes determining (S2340) whether or not the detected motion of the face satisfies a condition determined in advance. The method further includes increasing the detected motion of the face and translating the increased motion in the face of the avatar object 6 in response to a determination that the condition determined in advance is satisfied.

(Configuration 3)

A method according to Configuration 2, in which the step of detecting a motion of a face of the user 5 includes detecting a motion of a predetermined part of the face of the user 5. The condition determined in advance includes a condition that a variation amount of the predetermined part with respect to a predetermined state falls within a range determined in advance. The step of translating the increased motion includes increasing the motion of the predetermined part and translating the increased motion in the face of the avatar object 6.

(Configuration 4)

A method according to Configuration 3, in which the predetermined part includes at least one of a mouth, eyes, or eyebrows.

(Configuration 5)

A method according to Configuration 2, in which the step of detecting a motion of a face of the user 5 includes detecting a motion of a mouth of the user 5. The above-mentioned method further includes a step (S2520) of detecting utterance of the user 5. The condition determined in advance includes a condition that a size of the mouth is smaller than a threshold value (S2530) and a volume of the detected utterance of the user 5 is equal to or larger than a threshold value (S2520).

(Configuration 6)

A method according to any one of Configuration 1 to Configuration 5, in which the step of translating the increased motion includes setting a degree of increase in detected motion of the face depending on a type of the avatar object 6 in the virtual space 11.

(Configuration 7)

A method according to any one of Configuration 1 to Configuration 6, in which an HMD 120 includes a second camera 160 configured to photograph an upper part of the face of the user 5 and a first camera 150 configured to photograph a lower part of the face of the user 5. The step of detecting a motion of a face of the user 5 includes detecting the motion of the face of the user 5 based on an image generated by the first camera 150 and an image generated by the second camera 160.

(Configuration 8)

A method according to any one of Configuration 1 to Configuration 6, in which an HMD 120 includes an electromyograph configured to detect change in an electric characteristic value (e.g., voltage value) of muscles forming the face of the user 5. The step of detecting a motion of a face of the user 5 includes detecting the motion of the face of the user 5 based on output of the electromyograph.

It is to be understood that the embodiments disclosed herein are merely examples and in no way are intended to limit this disclosure. The scope of this disclosure is defined by the appended claims and not by the above description, and this disclosure encompasses all modifications made within the scope and spirit equivalent to those of the appended claims.

In the at least one embodiment described above, the description is given by exemplifying the virtual space (VR space) in which the user is immersed using an HMD. However, a see-through HMD may be adopted as the HMD. In this case, the user may be provided with a virtual experience in an augmented reality (AR) space or a mixed reality (MR) space through output of a field-of-view image that is a combination of the real space visually recognized by the user via the see-through HMD and a part of an image forming the virtual space. In this case, action may be exerted on a target object in the virtual space based on motion of a hand of the user instead of the operation object. Specifically, the processor may identify coordinate information on the position of the hand of the user in the real space, and define the position of the target object in the virtual space in connection with the coordinate information in the real space. With this, the processor can grasp the positional relationship between the hand of the user in the real space and the target object in the virtual space, and execute processing corresponding to, for example, the above-mentioned collision control between the hand of the user and the target object. As a result, an action is exerted on the target object based on motion of the hand of the user.

The invention claimed is:

1. A method, comprising:
    defining a virtual space, wherein the virtual space comprises a avatar associated with a user;
    detecting a motion of a portion of a first face of the user;
    generating face data representing the detected motion;
    detecting a magnitude of the motion of the portion of the first face; and
    controlling a second face of the avatar, wherein controlling the second face comprises:

controlling the second face using modified face data, having a different magnitude from the detected magnitude, in response to the detected magnitude exceeding a predetermined value, and controlling the second face using the face data in response to the detected magnitude being equal to or less than the predetermined value.

2. The method according to claim 1, wherein the portion of the first face comprises a mouth.

3. The method according to claim 1,
wherein the predetermined value comprises a magnitude value.

4. The method according to claim 1, wherein the detection of the motion of the portion of the first face comprises detection of motion of at least one of a mouth, eyes, or eyebrows.

5. The method according to claim 1, further comprising:
detecting a volume of an utterance by the first user,
wherein the detection of the motion of the portion of the comprises detection of motion of a mouth,
modifying the face data for controlling the second face, wherein the modifying of the face data comprises:
increasing a magnitude of the detected motion of the mouth in response to a determination that the volume of the utterance is above a first threshold value, and
decreasing a magnitude of the detected motion of the mouth in response to a determination that the volume of the utterance is below a second threshold value, and
wherein the controlling of the second face of the avatar object comprises controlling the face of the first avatar object based on the modified face data.

6. The method according to claim 1, further comprising:
acquiring type information representing a type of the avatar; and
modifying the face data based on the acquired type information, and
wherein the controlling of the second face comprises controlling the second face based on the modified face data.

7. The method according to claim 1, further comprising:
acquiring a first image of an upper part of the first face; and
acquiring a second image of a lower part of the first face,
wherein the detecting of the motion includes detecting the motion based on the first image and the second image.

8. The method according to claim 1, wherein the detecting of the motion of the portion of the first face of the user comprises detecting motion of at least one eyebrow of the first face of the user.

9. The method according to claim 1, wherein the detecting of the motion of the portion of the first face of the user comprises detecting motion of at least one eye of the first face of the user.

10. The method according to claim 1, wherein the detecting of the motion of the portion of the first face of the user comprises detecting motion of a mouth of the first face of the user.

11. The method according to claim 1, further comprising:
detecting a volume of an utterance by the first user;
modifying the face data for controlling the second face, wherein the modifying of the face data comprises:
increasing a magnitude of the detected motion in response to a determination that the volume of the utterance is above a first threshold value, and
decreasing a magnitude of the detected motion in response to a determination that the volume of the utterance is below a second threshold value.

12. The method according to claim 1, further comprising:
modifying the face data to change a magnitude of the detected motion after the controlling of the second face of the avatar based on the face data; and
controlling of the second face of the avatar based on the modified face data.

13. A non-transitory computer readable medium configured to store instructions thereon, wherein in response to executing the instructions a processor is configured to:
define a virtual space, wherein the virtual space comprises a first avatar object associated with a first user;
detect a motion of a portion of a face of the first user;
generate face data representing the detected motion of the portion of the face;
detect a magnitude of the motion of the portion of the first face; and
control a face of the first avatar object, wherein the face of the first avatar object is control by:
controlling the face of the first avatar object using modified face data, having a different magnitude from the detected magnitude, in response to the detected magnitude exceeding a predetermined value, and
controlling the face of the first avatar object using the face data in response to the detected magnitude being equal to or less than the predetermined value.

14. The non-transitory computer readable medium according to claim 13, wherein in response to executing the instructions the processor is configured to:
detecting a volume of an utterance by the first user,
wherein the portion of the face comprises a mouth,
modify the face data by:
increasing a magnitude of the detected motion of the mouth in response to a determination that the volume of the utterance is above a first threshold value, and
decreasing a magnitude of the detected motion of the mouth in response to a determination that the volume of the utterance is below a second threshold value, and control the face of the first avatar object based on the modified face data.

15. The non-transitory computer readable medium according to claim 13, wherein the predetermined value comprises a magnitude value.

16. The non-transitory computer readable medium according to claim 13, wherein in response to executing the instructions the processor is configured to:
detect the motion of the portion of the face of the user by detecting motion of at least one of a mouth, eyes, or eyebrows.

17. The non-transitory computer readable medium according to claim 13, wherein in response to executing the instructions the processor is configured to:
detect a volume of an utterance by the first user,
detect the motion of the portion of the face of the user by detecting motion of a mouth,
modify the face data by:
increasing a magnitude of the detected motion of the mouth in response to a determination that the volume of the utterance is above a first threshold value, and
decreasing a magnitude of the detected motion of the mouth in response to a determination that the volume of the utterance is below a second threshold value, and control the face of the first avatar object based on the modified face data.

18. A system, comprising:
a memory configured to store instructions thereon; and
a processor connected to the memory, wherein the processor is configured to execute the instructions for:
   defining a virtual space, wherein the virtual space comprises a first avatar object associated with a first user;
   detecting a motion of a portion of a face of the first user;
   generating face data representing the detected motion of the portion of the face;
   detecting a magnitude of the motion of the portion of the first face; and
   controlling a face of the first avatar object, wherein the controlling the face of the first avatar object comprises:
      controlling the face of the first avatar object using modified face data, having a different magnitude from the detected magnitude, in response to the detected magnitude exceeding a predetermined value, and
      controlling the face of the first avatar object using the face data in response to the detected magnitude being equal to or less than the predetermined value.

19. The system according to claim 18, further comprising:
a sensor, wherein the processor is configured to execute the instructions for:
   detecting the motion of the portion of the face based on information from the sensor; and
   modifying the face data based on information from the sensor.

20. The system according to claim 18, wherein the processor is configured to:
   detect a volume of an utterance by the first user,
   detect the motion of the portion of the face of the user by detecting motion of a mouth,
   modify the face data by:
      increasing a magnitude of the detected motion of the mouth in response to a determination that the volume of the utterance is above a first threshold value, and
      decreasing a magnitude of the detected motion of the mouth in response to a determination that the volume of the utterance is below a second threshold value, and
   control the face of the first avatar object based on the modified face data.

* * * * *